(12) United States Patent
Houssameddine et al.

(10) Patent No.: US 12,327,040 B2
(45) Date of Patent: Jun. 10, 2025

(54) FAST SELF-REFERENCED READ OF PROGRAMMABLE RESISTANCE MEMORY CELLS

(71) Applicant: SanDisk Technologies LLC, Addison, TX (US)

(72) Inventors: Dimitri Houssameddine, Sunnyvale, CA (US); Michael Nicolas Albert Tran, San Jose, CA (US); Ward Parkinson, Boise, ID (US); Michael Grobis, Campbell, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 145 days.

(21) Appl. No.: 18/356,814

(22) Filed: Jul. 21, 2023

(65) Prior Publication Data

US 2024/0184478 A1 Jun. 6, 2024

Related U.S. Application Data

(60) Provisional application No. 63/430,198, filed on Dec. 5, 2022.

(51) Int. Cl.
*G06F 3/00* (2006.01)
*G06F 3/06* (2006.01)

(52) U.S. Cl.
CPC .......... *G06F 3/0655* (2013.01); *G06F 3/0619* (2013.01); *G06F 3/0673* (2013.01)

(58) Field of Classification Search
CPC ..... G06F 3/0655; G06F 3/0619; G06F 3/0673
See application file for complete search history.

(56) References Cited

U.S. PATENT DOCUMENTS

| | | | |
|---|---|---|---|
| 9,025,364 B2 | 5/2015 | Kinney et al. | |
| 9,299,411 B2 | 3/2016 | Alam et al. | |
| 9,620,187 B2 | 4/2017 | Stainer | |
| 9,697,880 B2 | 7/2017 | Andre et al. | |
| 10,102,920 B2 | 10/2018 | Reusswig et al. | |
| 10,394,652 B2 | 8/2019 | Choi et al. | |
| 10,585,735 B2 | 3/2020 | Kinney et al. | |
| 2022/0157376 A1* | 5/2022 | Franklin | H01L 25/18 |
| 2022/0318084 A1* | 10/2022 | Kinney | G06F 11/0751 |

OTHER PUBLICATIONS

U.S. Appl. No. 17/485,129, filed Sep. 24, 2021.
U.S. Appl. No. 17/552,143, filed Dec. 15, 2021.

* cited by examiner

*Primary Examiner* — Craig S Goldschmidt
(74) *Attorney, Agent, or Firm* — Pearl Cohen Zedek Latzer Baratz LLP

(57) ABSTRACT

Technology is disclosed herein for reading programmable resistance memory cells. A first (faster) self-referenced read (SRR) of a group of memory cells is performed and if successful the read is complete. However, if the first SRR fails then a second (slower or nominal) SRR is performed. The bit error rate (BER) of the second SRR may be significantly lower than the BER of the first SRR. However, the BER of the first SRR may be low enough such that most of the time the first SRR is successful. Therefore, most of the time the read is completed with just the first SRR, thereby providing for an SRR having on average is faster than if just the second SRR had been used. Moreover, the effective BER of the SRR is extremely low due to the low BER of the second SRR.

20 Claims, 19 Drawing Sheets

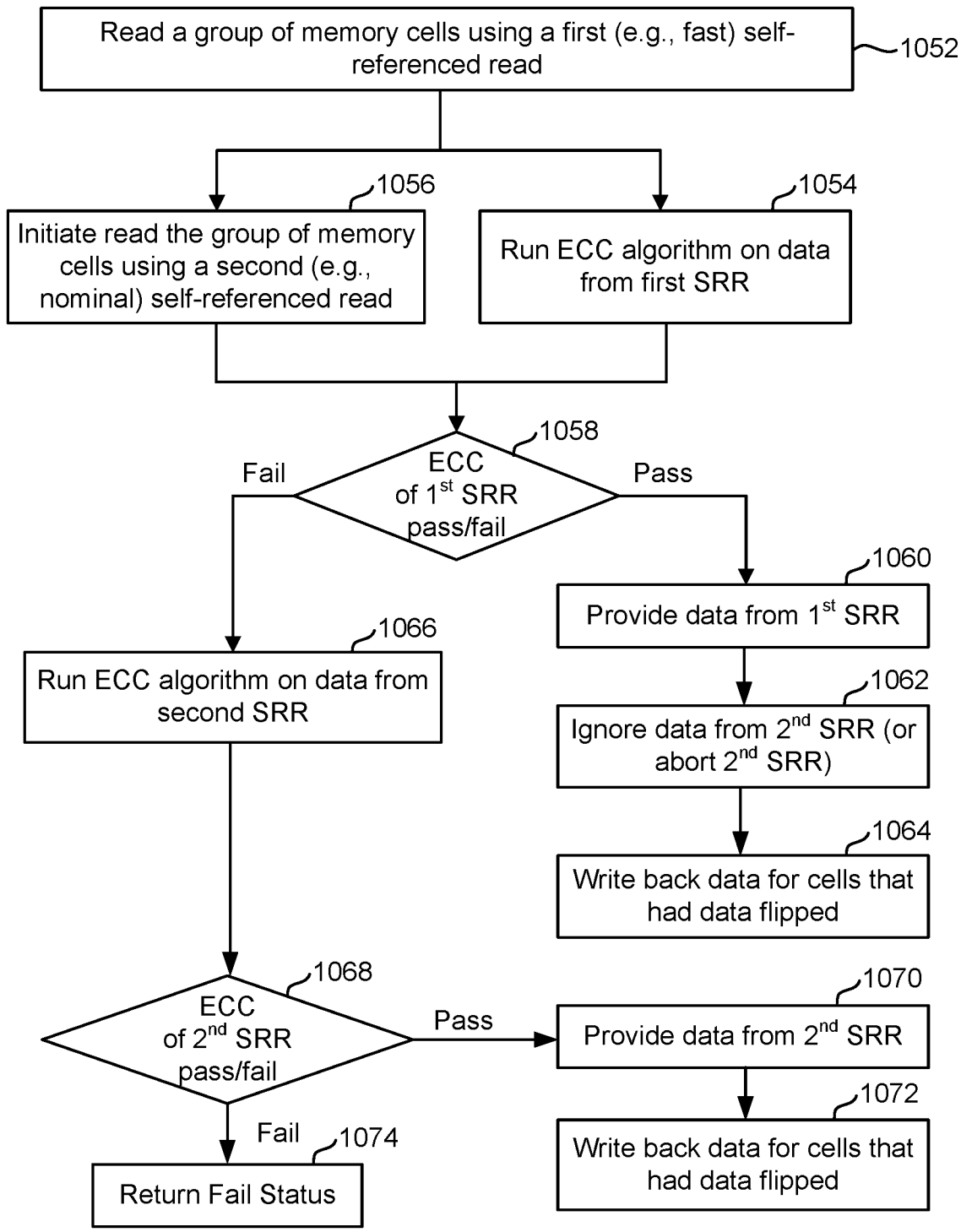

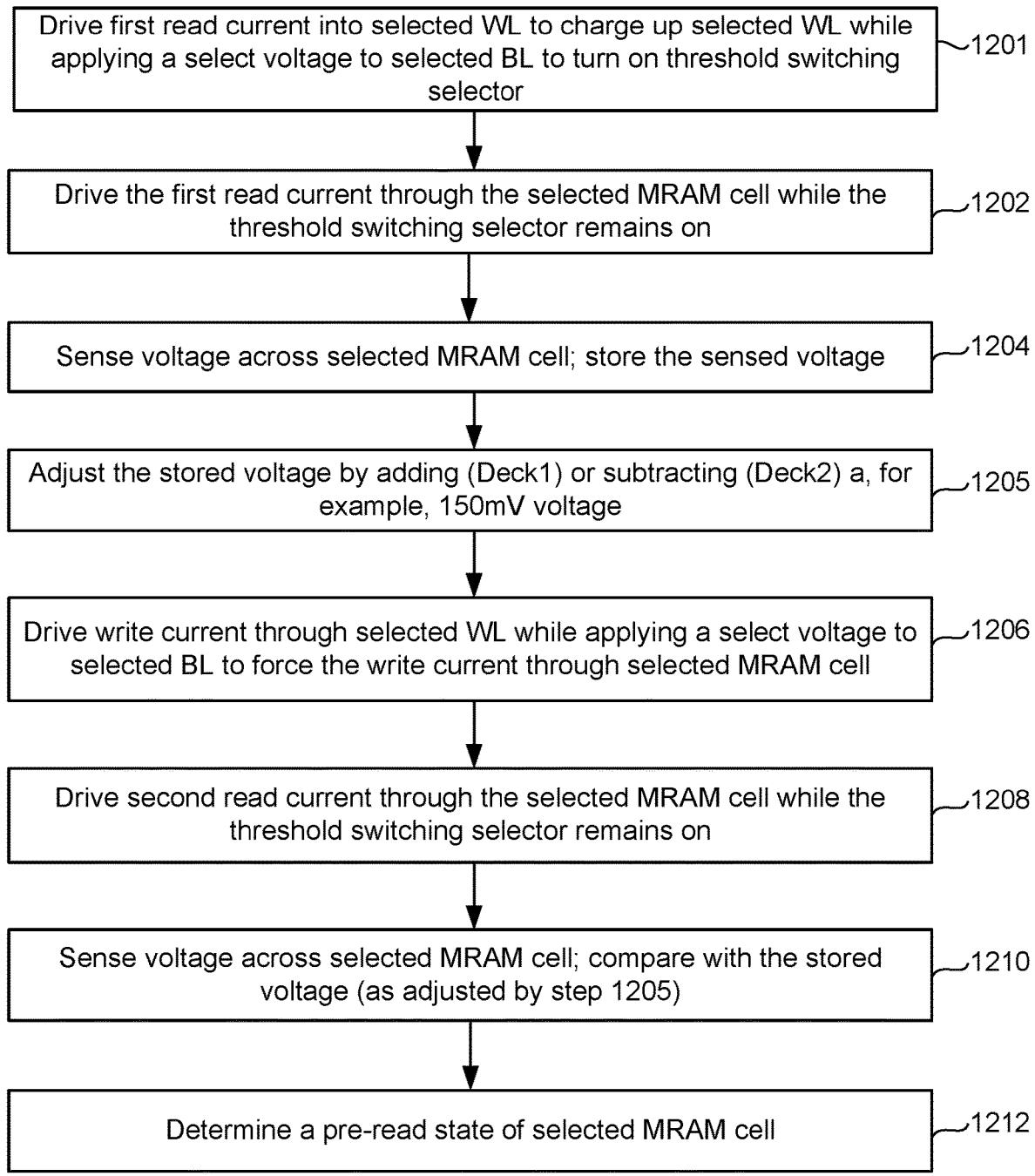

FAST SELF-REFERENCED READ OF PROGRAMMABLE RESISTANCE MEMORY CELLS

CLAIM OF PRIORITY

The present application claims priority from U.S. Provisional Patent Application No. 63/430,198, entitled "FAST SELF-REFERENCED READ OF PROGRAMMABLE RESISTANCE MEMORY CELLS," by Houssameddine et al., filed Dec. 5, 2022, incorporated by reference herein in its entirety.

BACKGROUND

Memory is widely used in various electronic devices such as cellular telephones, digital cameras, personal digital assistants, medical electronics, mobile computing devices, non-mobile computing devices, and data servers. Memory may comprise non-volatile memory or volatile memory. A non-volatile memory allows information to be stored and retained even when the non-volatile memory is not connected to a source of power (e.g., a battery).

A programmable resistance memory cell is formed from a material having a programmable resistance. In a binary approach, the programmable resistance memory cell can be programmed into one of two resistance states: high resistance state (HRS) and low resistance state (LRS). In some approaches, more than two resistance states may be used. One type of programmable resistance memory cell is a magnetoresistive random access memory (MRAM) cell. An MRAM cell uses magnetization to represent stored data, in contrast to some other memory technologies that use electronic charges to store data. A bit of data is written to an MRAM cell by changing the direction of magnetization of a magnetic element ("the free layer") within the MRAM cell, and a bit is read by measuring the resistance of the MRAM cell (low resistance typically represents a "0" bit and high resistance typically represents a "1" bit).

One technique for reading programmable resistance memory cells is commonly referred to as a referenced read. A referenced read is sometimes referred to as a midpoint read or midpoint referenced read. A referenced read may use a reference that is between the lower resistance state (LRS) and the higher resistance state (HRS). For example, the midpoint reference may be a reference voltage that is midway between two voltages that correspond to sensing the cell with either the LRS or the HRS. Sensing the memory cell will typically result in either a voltage or a current depending on the sensing technique. In some cases the sensed current will be converted to a voltage to be compared with the midpoint reference voltage. The memory cell's state is determined based on whether the sensed voltage is higher or lower than the midpoint reference voltage.

Another technique for reading programmable resistance memory cells is commonly referred to as a destructive self-referenced read (SRR). In a SRR rather than using midpoint reference that is independent of the state of the cell, the reference is generated based on sensing the cell itself. In a destructive SRR it is possible that the state of the memory cell is changed (e.g., destroyed) by a write operation of the SRR. One SRR technique includes a first read, a destructive write to a known state (e.g., the HRS), and a second read. The results of the two reads are compared to determine the original state of the cell. One technique for the first read is to apply a read current through the memory cell, resulting in a voltage across the cell having a magnitude that is representative of the resistance of the memory cell. The voltage is stored and may be adjusted (for example, up by 150 mv) for comparison with a voltage sample from the second read. The determination of the original state of the memory cell depends on the difference between the first adjusted read voltage and the second read voltage. For example, the voltage from forcing a 20 ua read current through the selected memory cell may be 1.6V when LRS or 1.9V if HRS. So if the first Read is a bit in the LRS, 1.6V is stored and adjusted by 150 mV to 1.75V. If the first Read is a bit in the HRS, 1.9V is stored and adjusted up by 150 mV to 2.05V. Then write changes the bit state to HRS regardless of its state during first read. And the second read may be 1.9V which can be compared to 1.75V LRS or 2.05V HRS stored from the first read. Thereby the comparison in a sense amp of 1.75V and 2.05 to 1.9V generates respectively a 0 for LRS and 1 for HRS. If the write changed the state of the cell then a write-back is performed to restore the original state of the cell. For example, if the cell was originally in the LRS but was written to the HRS, then the cell is written back to the LRS, often labeled as a "write back".

The raw data from reading a group of the cells is typically run through an error detection and correction algorithm. This group of cells may compose an ECC codeword. An error detection and correction algorithm will typically be able to correct up to a certain number of bit errors in the ECC codeword. Thus, if the bit error rate (BER) is too high the read fails. Note that the BER may depend on the type of memory cell being read. A SRR may have a lower BER than a midpoint referenced read, for a given type of memory cell. However, the BER of a midpoint referenced read for the given type of memory cell might not be satisfactory. Thus, a midpoint referenced read might not be satisfactory for some types of memory cells. However, a SRR will typically take longer to perform than a midpoint referenced read due to the write and the second read.

BRIEF DESCRIPTION OF THE DRAWINGS

Like-numbered elements refer to common components in the different figures.

FIG. 10B is a flowchart of one embodiment of a process 1050 of reading programmable resistance memory cells with a fast SRR in which a second SRR is initiated whether or not the first SRR fails.

FIG. 12 is a flowchart depicting one embodiment of a process of current-force SRR.

DETAILED DESCRIPTION

Figure 1:
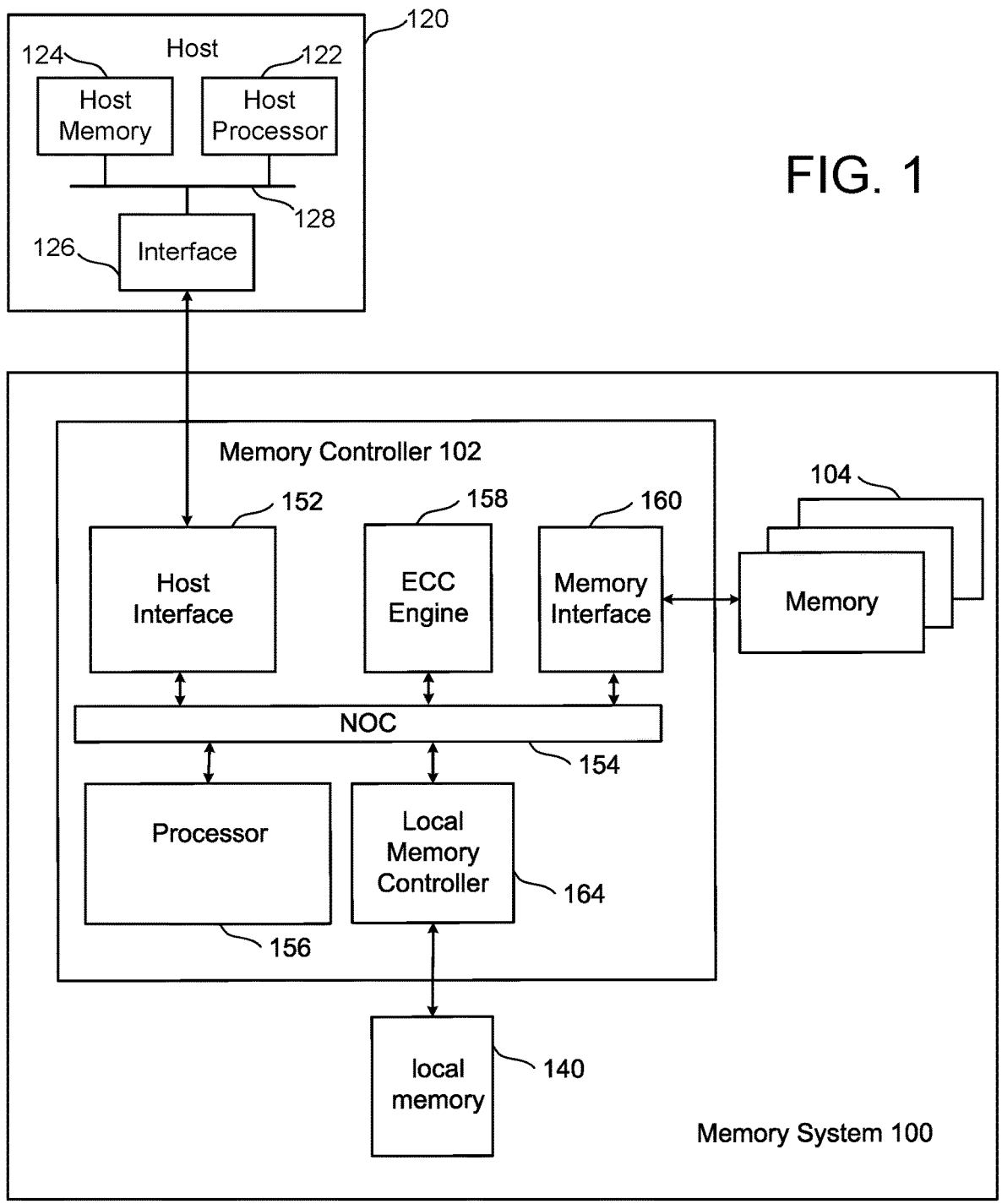
FIG. 1 is a block diagram of one embodiment of a non-volatile memory system connected to a host.

Technology is disclosed herein for reading programmable resistance memory cells. In an embodiment, a first (e.g., faster) self-referenced read (SRR) of a group of memory cells is performed and if successful the read is complete. However, if the first SRR fails then a second (e.g., slower or nominal) SRR is performed on the group of memory cells. In an embodiment, the failure of the first SRR is a failure to decode an ECC codeword stored in the group of memory cells using an error detection and correction algorithm. Although the second SRR may be slower than the first SRR, the BER of the second SRR may be significantly lower than the BER of the first SRR. However, the BER of the first SRR may be low enough such that most of the time the first SRR is successful. Therefore, most of the time the read is completed with just the first (faster cycle time) SRR, thereby providing for an SRR having an overall average cycle time that is faster than if just the second SRR had been used for many groups of cells. Moreover, the effective BER of the SRR is extremely low due to the lower BER of the second (slower cycle time) SRR, given that the results from the first SRR are not used if the first SRR fails ECC checks.

In one embodiment, the first SRR includes applying a first sequence of signals to the memory cells. The first sequence of signals may include a first read (Read1) signal applied to the memory cells followed by a first write signal applied to the memory cells followed by a second read signal (Read2) applied to the memory cells. In one embodiment, the second SRR includes applying a second sequence of signals to the memory cells. The second sequence of signals may include a second write signal applied to the memory cells followed by a third read signal (Read3) applied to the memory cells.

In an embodiment, the second write signal in the second SRR has a longer duration than the first write signal in the first SRR. The longer duration of the second write signal may provide for a lower BER for the second SRR relative to the first SRR.

In one embodiment, the first SRR includes a first read operation of each memory cell followed by a first write operation of each memory cell followed by a second read operation of each memory cell. In one embodiment, the second SRR includes second write operation of each memory cell followed by a third read operation of each memory cell. The third read operation of the second SRR may have a longer duration than the second read operation of the first SRR. The longer duration of the third read operation may provide for a lower BER for the second SRR. In an embodiment, the longer duration of the third read operation is combined with the longer duration of the second write signal in the second SRR.

In one embodiment of SRR as disclosed herein the programmable resistance memory cells reside in a cross-point memory array. In a memory array with a cross-point type architecture, one set of conductive lines run across the surface of a substrate and another set of conductive lines are formed over the other set of conductive lines, running over the substrate in a direction perpendicular to the other set of conductive lines. The memory cells are located at the cross-point junctions of the two sets of conductive lines. Cross-point memory arrays are sometimes referred to as cross-bar memory arrays. However, SRR of programmable resistance memory cells as disclosed herein is not limited to memory cells in cross-point memory arrays or memory cells composed of MRAM or OTS. These elements of the memory cell may be changed to be other technologies such as ReRam, PCM and the selector element of the memory cell may be changed to be any on/off switch such as a transistor, diode, or SCR, for example.

In a cross-point memory array, each memory cell may contain a threshold switching selector in series with a programmable resistance memory element. The threshold switching selector has a high resistance (in an off or non-conductive state) until it is biased to a voltage higher than its threshold voltage (Vt) or current above its threshold current, and until its voltage bias falls below Vhold ("Voffset") or current below a holding current Ihold. After the Vt is exceeded and while Vhold is exceeded across the threshold switching selector, the threshold switching selector has a low resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. Accordingly, to read a memory cell at a cross-point, a voltage may be applied which is sufficient to turn on the associated threshold switching selector and before the resistance state of the memory cell is determined. One example of a threshold switching selector is an Ovonic Threshold Switch (OTS). In one embodiment of SRR as disclosed herein the programmable resistance memory cells each have a programmable resistance memory element in series with a threshold switching selector. However, SRR of programmable resistance memory cells as disclosed herein is not limited to programmable resistance memory cells having threshold switching selectors. In one embodiment, SRR as disclosed herein is used with a one-transistor/one-resistor (1T1R) architecture.

In some embodiments, the programmable resistance memory cell has a magnetoresistive random access memory (MRAM) element. As used herein, direction of magnetization is the direction that the magnetic moment is oriented with respect to a reference direction set by another element of the MRAM ("the reference layer"). In some embodiments, the low resistance is referred to as a parallel or P-state and the high resistance is referred to as an anti-parallel or AP-state. MRAM can use the spin-transfer torque effect to change the direction of the magnetization from P-state to AP-state and vice-versa, which typically requires bipolar (bi-directional write) operation for writes. However, SRR of programmable resistance memory cells as disclosed herein is not limited to cells having MRAM elements.

One technique for reading a programmable resistance memory cell, such as those in a cross-point memory array and having a series threshold switching selector, is a current-force read. In an embodiment of a current-force read a current source forces a read current through the memory cell and a voltage that appears across the memory cell (including the threshold switching selector if used) as a result is measured. The measured voltage may include the select decode transistors that is representative of the resistance of the memory cell. A current-force technique may also be used to write programmable resistance memory cells to a target state. However, SRR of programmable resistance memory cells as disclosed herein is not limited to current-force techniques. For example, SRR as disclosed herein may use a voltage-force technique for read or write.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable tolerance for a given application.

FIG. 1 is a block diagram of one embodiment of a non-volatile memory system (or more briefly "memory system") 100 connected to a host system 120. Memory system 100 can implement the technology presented herein for a fast SRR of programmable resistance memory cells. In an embodiment, the memory cells have a programmable resistance memory element (e.g., MRAM element) in series with a threshold switching selector such as an OTS. Many types of memory systems can be used with the technology proposed herein. Example memory systems include dual in-line memory modules (DIMMs), solid state drives ("SSDs"), memory cards and embedded memory devices; however, other types of memory systems can also be used.

Memory system 100 of FIG. 1 comprises a memory controller 102, memory 104 for storing data, and local memory 140 (e.g., MRAM, ReRAM, DRAM). The local memory 140 may be non-volatile and retain data after power off. The local memory 140 may be volatile and not be expected to retain data after power off. In one embodiment the local memory 140 is MRAM. In an embodiment, the local memory MRAM is not required to retain data after power-off. However, the local memory MRAM may retain data after power-off. In one embodiment, memory controller 102 and/or local memory controller 164 provides access to programmable resistance memory cells in local memory 140. For example, memory controller 102 may provide for access in a cross-point array of MRAM cells in local memory 140. In another embodiment the memory controller 102 or interface 126 or both are eliminated and the memory packages are connected directly to the host 120 through a bus such as DDRn. Or they are connected to a Host memory management unit (MMU). In another instance, the memory controller 102 or portions are moved onto the Memory 104 for direct connection of the Memory 104 to the Host, such as by providing parity bits, ECC, and wear level on the Memory along with an DDRn interface to/from the Host or MMU. The term memory system, as used throughout this document, is not limited to memory system 100. For example, the local memory 140 or the combination of local memory 140 and local memory controller 164 could be considered to be a memory system. Likewise, host memory 124 or the combination of host processor 122 and host memory 124 considered to be a memory system.

The components of memory system 100 depicted in FIG. 1 are electrical circuits. The memory controller 102 has host interface 152, processor 156, ECC engine 158, memory interface 160, and local memory controller 164. The host interface 152 is connected to and in communication with host 120. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., MRAM). In other embodiments, local high speed memory 140 can be DRAM, SRAM or another type of volatile memory.

ECC engine 158 performs error correction services. For example, ECC engine 158 performs data encoding and decoding of parity bits provided on or off the memory as part of the code word used for error correction of the data fetched from memory 140 or 104. In one embodiment, ECC engine 158 is an electrical circuit programmed by software. For example, ECC engine 158 can be a processor that can be programmed. In other embodiments, ECC engine 158 is a custom and dedicated hardware circuit without any software. In one embodiment, the function of ECC engine 158 is implemented by processor 156. In one embodiment, local memory 140 has an ECC engine with or without a wear level engine. In one embodiment, memory 104 has an ECC engine with or without a wear level engine.

Processor 156 performs the various controller memory operations, such as programming, erasing, reading, and memory management processes including wear level. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 102 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory 104 and a subset of the L2P tables are cached (L2P cache) in the local high speed memory 140.

Memory interface 160 communicates with non-volatile memory 104. In an embodiment, non-volatile memory 104 contains programmable resistance memory cells in a cross-point array. In one embodiment, memory interface provides a Toggle Mode interface. Other interfaces can also be used. In some example implementations, memory interface 160 (or another portion of controller 102) implements a scheduler and buffer for transmitting data to and receiving data from one or more memory die.

In one embodiment, local memory 140 has an ECC engine. Local memory 140 may perform other functions such as wear leveling. Further details of on-chip memory maintenance are described in U.S. Pat. No. 10,545,692, titled "Memory Maintenance Operations During Refresh Window", and U.S. Pat. No. 10,885,991, titled "Data Rewrite During Refresh Window", both of which are hereby incorporated by reference in their entirety. In an embodiment, the local memory 140 is synchronous. In an embodiment, the local memory 140 is asynchronous.

In one embodiment, memory 104 comprises a plurality of memory packages. Each memory package includes one or more memory dies. Therefore, memory controller 102 is connected to one or more memory dies. In one embodiment, the memory package can include types of memory, such as storage class memory (SCM) based on programmable resistance random access memory (such as ReRAM, MRAM, FeRAM or RRAM) or a phase change memory (PCM). In one embodiment, memory controller 102 provides access to memory cells in a cross-point array in a memory package 104.

Memory controller 102 communicates with host system 120 via an interface 152 that implements a protocol such as, for example, Compute Express Link (CXL). Or such controller can be eliminated and the memory packages can be placed directly on the host bus, DDRn for example. For working with memory system 100, host system 120 includes a host processor 122, host memory 124, and interface 126 connected along bus 128. Host memory 124 is the host's physical memory, and can be DRAM, SRAM, ReRAM, MRAM, non-volatile memory, or another type of storage. In an embodiment, host memory 124 contains a cross-point array of programmable resistance memory cells, with each memory cell comprising a programmable resistance memory element and a two terminal threshold selector element in series with the programmable resistance memory element.

Host system 120 is external to and separate from memory system 100. In one embodiment, memory system 100 is embedded in host system 120. Host memory 124 may be referred to herein as a memory system. The combination of the host processor 122 and host memory 124 may be referred to herein as a memory system. In an embodiment, such host memory can be cross-point memory using MRAM.

Figure 2:
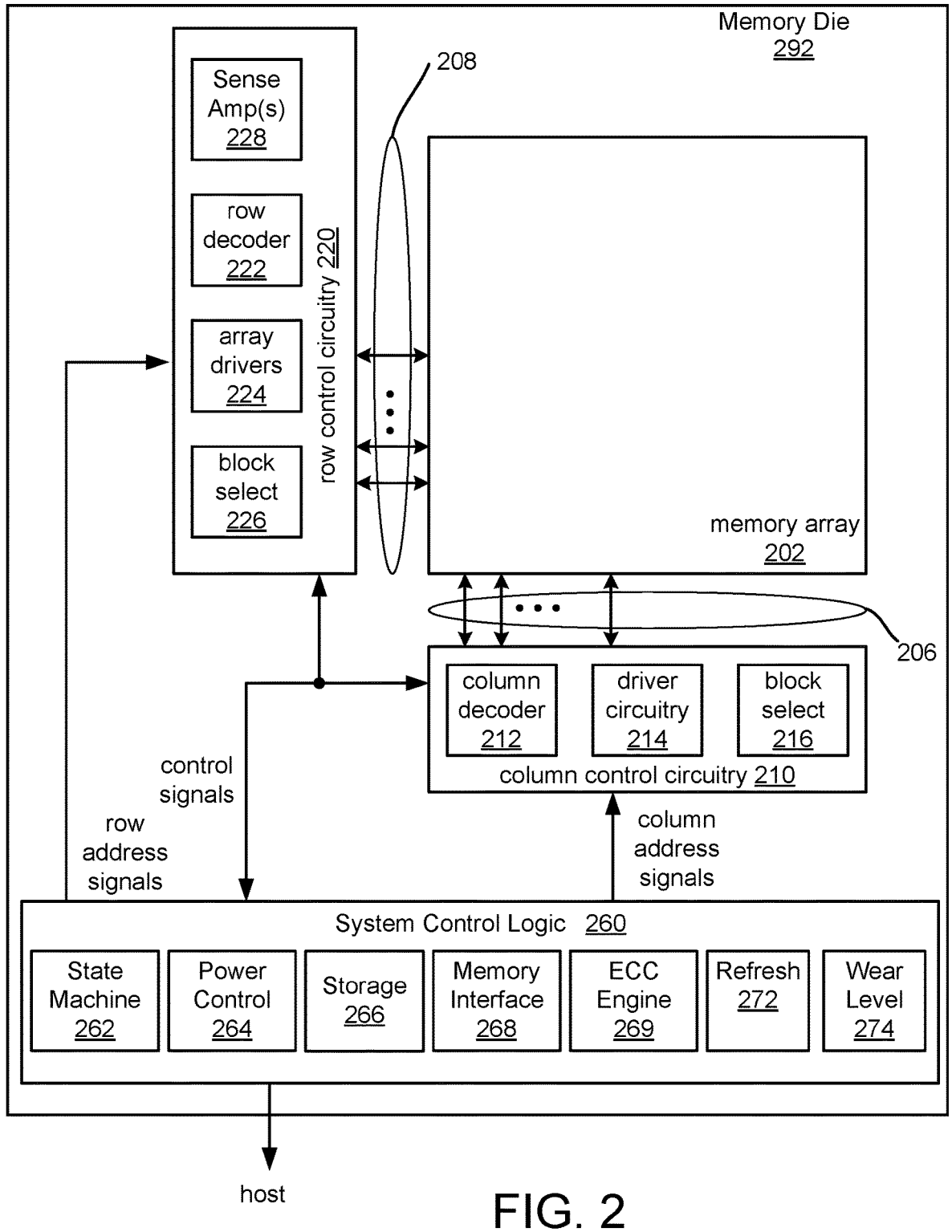
FIG. 2 is a block diagram of one embodiment of a memory die.

FIG. 2 is a block diagram that depicts one example of a memory die 292 that can implement the technology described herein. In one embodiment, memory die 292 is included in local memory 140, and in embodiment another in Memory 104. In one embodiment, memory die 292 is included in host memory 124. Memory die 292 includes a memory array 202 that can include any of memory cells described in the following. The array terminal lines of memory array 202 include the various layer(s) of word lines organized as rows, and the various layer(s) of bit lines organized as columns. However, other orientations can also be implemented. Memory die 292 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, row drivers 224, and block select circuitry 226 for both reading and writing operations. Row control circuitry 220 may also include read/write circuitry. In an embodiment, row decode and control circuitry 220 has sense amplifiers 228, which each contain circuitry for sensing a condition (e.g., voltage) of a word line of the memory array 202. In an embodiment, by sensing a word line voltage, a condition of a memory cell in a cross-point array is determined. Memory die 292 also includes column decode and control circuitry 210 whose input/outputs 206 are connected to respective bit lines of the memory array 202. Although only a single block is shown for array 202, a memory die can include multiple arrays or "tiles" that can be individually accessed. Column control circuitry 210 receives a group of N column address signals and one or more various control signals from System Control Logic 260, and typically may include such circuits as column decoders 212, column decoders and drivers 214, block select circuitry 216, as well as read/write circuitry, and I/O multiplexers.

System control logic 260 receives data and commands from a host system and provides output data and status to the host system. In other embodiments, system control logic 260 receives data and commands from a separate controller circuit and provides output data to that controller circuit, with the controller circuit communicating with the host system. Such controller system implement an interface such as DDR, DIMM, CXL, PCIe and others. In another embodiment those data and commands are sent and received directly from the memory packages to the Host without a separate controller, and any controller needed is within each die or within a die added to a multi-chip memory package. In some embodiments, the system control logic 260 can include a state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor. The system control logic 260 can also include a power control module 264 that controls the power, current source currents, and voltages supplied to the rows and columns of the memory 202 during memory operations and may include charge pumps and regulator circuit for creating regulating voltages, and on/off control of each for word line bit line selection of the memory cells. System control logic 260 includes storage 266, which may be used to store parameters for operating the memory array 202. System control logic 260 also includes refresh logic 272 and wear leveling logic 274. Such system control logic may be commanded by the host 120 or memory controller 102 to refresh logic 272, which may load an on-chip stored row and column address (Pointer) which may be incremented after refresh. Such address bit(s) may be selected only (to refresh the OTS). Or such address may be read, corrected by steering through ECC engine 269, and then stored in a "spare" location, which is also being incremented (so all codewords are periodically read, corrected, and relocated in the entire chip under control of wear leveling logic 274) to in effect wear level so use of each bit across the chip is more uniform. Such operation may be more directly controlled by the host of an external controller, for example a PCIe or CXL controller located separately from the memory chip or on the memory die.

Commands and data are transferred between the memory controller 102 and the memory die 292 via memory controller interface 268 (also referred to as a "communication interface"). Such interface may be PCIe, CXL, DDRn for example. Memory controller interface 268 is an electrical interface for communicating with memory controller 102. Examples of memory controller interface 268 also include a Toggle Mode Interface. Other I/O interfaces can also be used. For example, memory controller interface 268 may implement a Toggle Mode Interface that connects to the Toggle Mode interfaces of memory interface 228/258 for memory controller 102. In one embodiment, memory controller interface 268 includes a set of input and/or output (I/O) pins that connect to the controller 102. In another embodiment, the interface is JEDEC standard DDRn or LPDDRn, such as DDR5 or LPDDR5, or a subset thereof with smaller page and/or relaxed timing.

System control logic 260 located in a controller on the memory die in the memory packages may include Error Correction Code (ECC) engine 269. ECC engine 269 may be referred to as an on-die ECC engine, as it is on the same semiconductor die as the memory cells. That is, the on-die ECC engine 269 may be used to encode data that is to be stored in the memory array 202, and to decode the decoded data and correct errors. The encoded data may be referred to herein as a codeword or as an ECC codeword. ECC engine 269 may be used to perform a decoding algorithm and to perform error correction. Hence, the ECC engine 269 may decoded the ECC codeword. In an embodiment, the ECC engine 269 is able to decode the data more rapidly by direct decoding without iteration.

Having the ECC engine 269 on the same die as the memory cells allows for faster decoding. The ECC engine 269 can use a wide variety of decoding algorithms including, but not limited to, Reed Solomon, a Bose-Chaudhuri-Hocquenghem (BCH), and low-density parity check (LDPC). In an embodiment, the ECC engine 269 is capable of decoding a codeword provided that there are no more than a certain number of bits in error in the codeword.

In some embodiments, all of the elements of memory die 292, including the system control logic 260, can be formed as part of a single die. In other embodiments, some or all of the system control logic 260 can be formed on a different die.

In one embodiment, memory structure 202 comprises a three-dimensional memory array of non-volatile or volatile memory cells in which multiple memory levels are formed above a single substrate, such as a wafer. The memory structure may comprise any type of non-volatile or volatile memory that are monolithically formed in one or more physical levels of memory cells having an active area disposed above a silicon (or other type of) substrate. In another embodiment, memory structure 202 comprises a two-dimensional memory array of non-volatile memory cells.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM or MRAM cross-point memory includes programmable resistance switching elements in series with and OTS selector arranged in cross-point arrays accessed by X lines and Y lines (e.g., word lines and bit lines). In another embodiment of cross-point is PCM in series with and OTS selector. In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive random access memory (MRAM) stores data using magnetic storage elements. The elements are formed from two ferromagnetic layers, each of which can hold a magnetization, separated by a thin insulating layer. For a field-controlled MRAM, one of the two layers is a permanent magnet set to a particular polarity; the other layer's magnetization can be changed by applying an external field to store memory. Other types of MRAM cells are possible. A memory device may be built from a grid of MRAM cells. In one embodiment for programming, each memory cell lies between a pair of write lines arranged at right angles to each other, parallel to the cell, one above and one below the cell. For some MRAM cells, when current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). The memory cells are programmed by current pulses that can change the co-ordination of the PCM material or switch it between amorphous and crystalline states. Note that the use of "pulse" in this document does not require a square pulse but includes a (continuous or non-continuous) vibration or burst of sound, current, voltage light, or other wave. And the current forced for write can, for example, be driven rapidly to a peak value and then linearly ramped lower with, for example, a 200 ns edge rate. Such peak current force may be limited by a zoned voltage compliance that varies by position of the memory cell along the word line or bit line. In an embodiment, a phase change memory cell has a phase change memory element in series with a threshold switching selector such as an OTS.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2 can be grouped into two parts, the memory structure 202 and the peripheral circuitry, including all of the other elements. An important characteristic of a memory circuit is its capacity, which can be increased by increasing the area of the memory die 292 that is given over to the memory structure 202; however, this reduces the area of the memory die available for the peripheral circuitry or increases cost which is related to chip area. This can place quite severe restrictions on these peripheral elements. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die 292 is the amount of area to devote to the memory structure 202 and the amount of area to devote to the peripheral circuitry. Such tradeoffs may result in more IR drop from use of larger x-y arrays of memory between driving circuits on the word line and bit line, which in turn may be benefit more from use of voltage limit and zoning of the voltage compliance by memory cell position along the word line and bit line.

Another area in which the memory structure 202 and the peripheral circuitry are often at odds is in the processing involved in forming these regions, since these regions often involve differing processing technologies and the trade-off in having differing technologies on a single die. For example, elements such as sense amplifier circuits, charge pumps, logic elements in a state machine, and other peripheral circuitry in system control logic 260 often employ PMOS devices. In some cases, the memory structure will be based on CMOS devices. Processing operations for manufacturing a CMOS die will differ in many aspects from the processing operations optimized for NMOS-only technologies.

Figure 3:
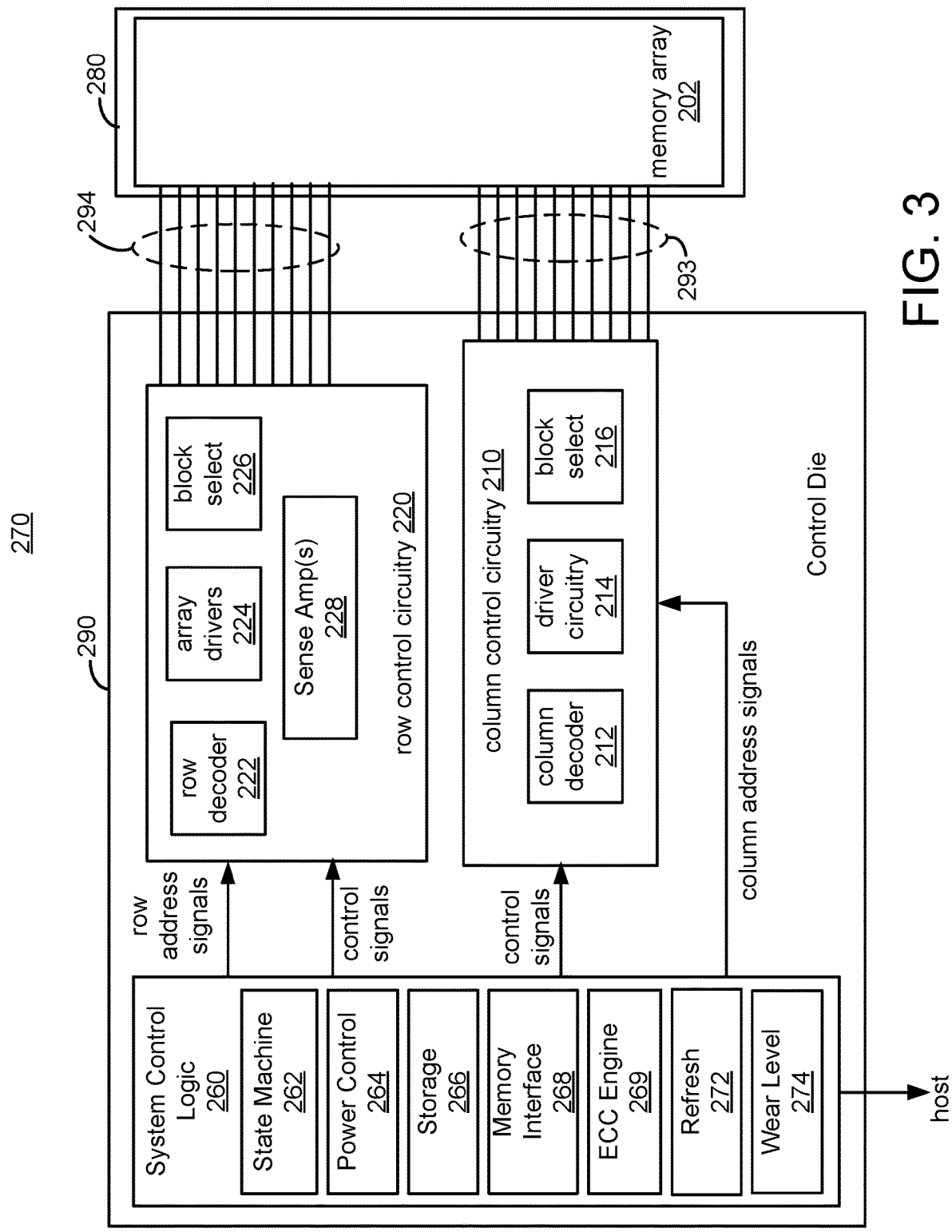
FIG. 3 is a block diagram of one embodiment of an integrated memory assembly containing a control die and a memory structure die.

To improve upon these limitations, embodiments described below can separate the elements of FIG. 2 onto separately formed die that are then bonded together. FIG. 3 depicts an integrated memory assembly 270 having a memory structure die 280 and a control die 290. The memory structure 202 is formed on the memory structure die 280 and some or all of the peripheral circuitry elements, including one or more control circuits, are formed on the control die 290. For example, a memory structure die 280 can be formed of just the memory elements, such as the array of memory cells of MRAM memory, PCM memory, ReRAM memory, or other memory type. Some or all of the peripheral circuitry, even including elements such as decoders and sense amplifiers, can then be moved on to the control die. This allows each of the semiconductor die to be optimized individually according to its technology. This allows more space for the peripheral elements, which can now incorporate additional capabilities that could not be readily incorporated were they restricted to the margins of the same die holding the memory cell array. The two die can then be bonded together in a bonded multi-die integrated memory assembly, with the array on the one die connected to the periphery elements on the other die. Although the following will focus on an integrated memory assembly of one memory die and one control die, other embodiments can use additional die, such as two memory die and one control die, for example.

As with 202 of FIG. 2, the memory structure die 280 in FIG. 3 can include multiple independently accessible arrays or "tiles." System control logic 260, row control circuitry 220, and column control circuitry 210 are located in control die 290. In some embodiments, all or a portion of the column control circuitry 210 and all or a portion of the row control circuitry 220 are located on the memory structure die 280. In some embodiments, some of the circuitry in the system control logic 260 is located on the on the memory structure die 280.

FIG. 3 shows column control circuitry 210 on the control die 290 coupled to memory structure 202 on the memory structure die 280 through electrical paths 293. For example, electrical paths 293 may provide electrical connection between column decoder 212, column driver circuitry 214, and block select 216 and bit lines of memory structure 202. Electrical paths may extend from column control circuitry 210 in control die 290 through pads on control die 290 that are bonded to corresponding pads of the memory structure die 280, which are connected to bit lines of memory structure 202. Each bit line of memory structure 202 may have a corresponding electrical path in electrical paths 293, including a pair of bond pads, which connects to column control circuitry 210. Similarly, row control circuitry 220, including row decoder 222, row drivers 224, block select 226, and sense amplifiers 228 are coupled to memory structure 202 through electrical paths 294. Each of electrical path 294 may correspond to, for example, a word line. Additional electrical paths may also be provided between control die 290 and memory structure die 280.

For purposes of this document, the phrase "a control circuit" can include one or more of memory controller 102 (or one or more of local memory controller 164, processor 156 ECC engine 158, host interface 152 and/or memory interface 160), system control logic 260, column control circuitry 210, row control circuitry 220, host processor 122, a micro-controller, a state machine, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit. Such control circuitry may include drivers such as direct drive via connection of a node through fully on transistors (gate to the power supply) driving to a fixed voltage such as a power supply. Such control circuitry may include a current source driver.

For purposes of this document, the term "apparatus" can include, but is not limited to, one or more of host system 120, the combination of host processor 122 and host memory 124, host memory 124, memory system 100, memory controller 102, local memory 140, the combination of local memory controller 164 and/or memory controller 102 and local memory 140, memory package 104, memory die 292, integrated memory assembly 270, and/or control die 290.

In the following discussion, the memory array 202 of FIGS. 2 and 3 will be discussed in the context of a cross-point architecture. In a cross-point architecture, a first set of conductive lines or wires, such as word lines, run in a first direction relative to the underlying substrate and a second set of conductive lines or wires, such a bit lines, run in a second direction relative to the underlying substrate. The memory cells are sited at the intersection of the word lines and bit lines. The memory cells at these cross-points can be formed according to any of a number of technologies, including those described above. The following discussion will mainly focus on embodiments based on a cross-point architecture using MRAM memory cells, each in series with a threshold switching selector such as Ovonic Threshold Switch (OTS) to comprise a selectable memory bit. However, embodiments of SRR are not limited to a cross-point architecture having MRAM cells each with magnetic memory element in a series OTS selector.

Figure 4A:
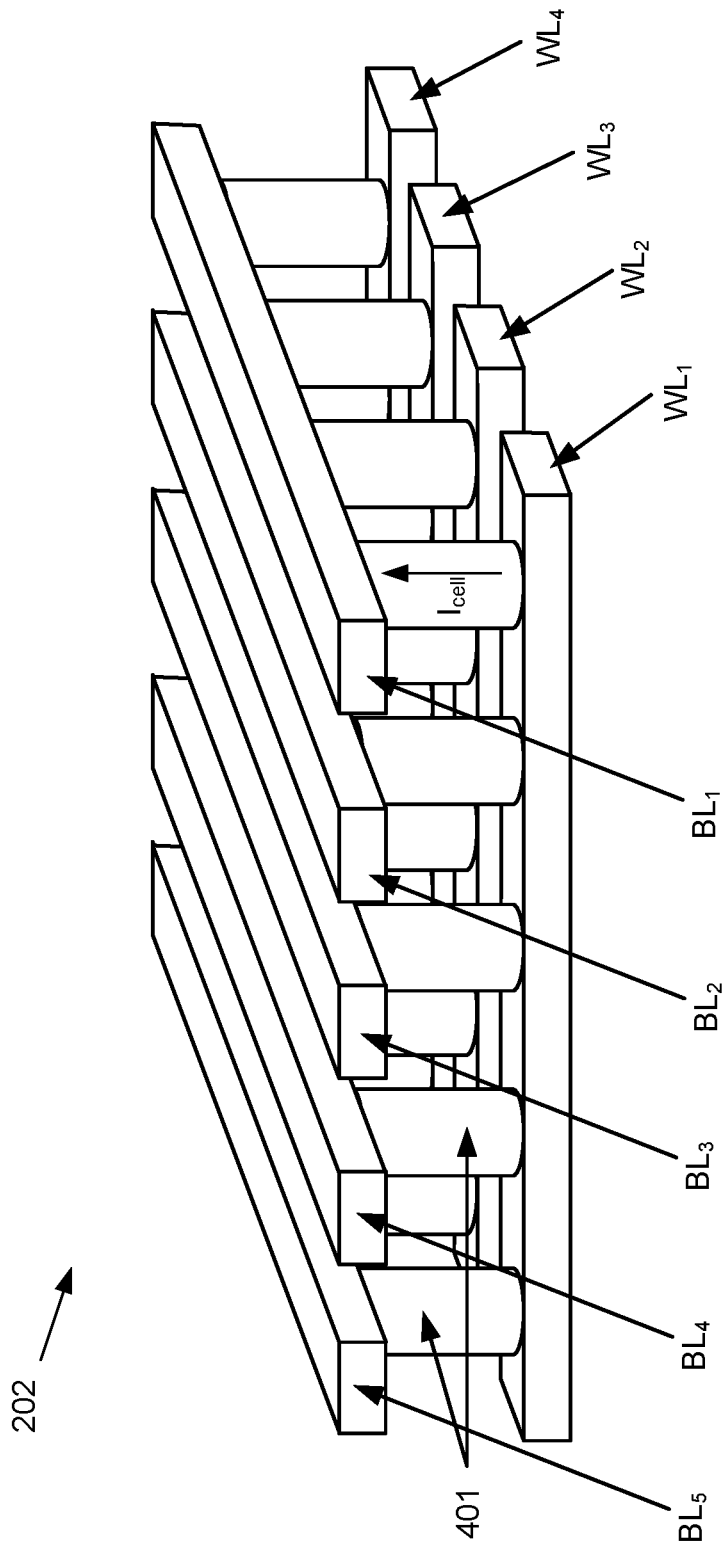
FIG. 4A depicts one embodiment of a portion of a memory array that forms a cross-point architecture in an oblique view.

FIG. 4A depicts one embodiment of a portion of a memory array that forms a cross-point architecture in an oblique view. Memory array 202 of FIG. 4A is one example of an implementation for memory array 202 in FIG. 2 or 3, where a memory die 292 or memory structure die 280 can include multiple such array structures. The memory array 202 may be included in local memory 140 or host memory 124. The bit lines $BL_1$-$BL_5$ are arranged in a first direction (represented as running into the page) relative to an underlying substrate (not shown) of the die and the word lines $WL_1$-$WL_5$ are arranged in a second direction perpendicular to the first direction. FIG. 4A is an example of a horizontal cross-point structure in which word lines $WL_1$-$WL_5$ and $BL_1$-$BL_5$ both run in a horizontal direction relative to the substrate, while the memory cells, two of which are indicated at 401, are oriented so that the current through a memory cell (such as shown at $I_{cell}$) runs in the vertical direction. In a memory array with additional layers of memory cells, such as discussed below with respect to FIG. 4D, there would be corresponding additional layers of bit lines and word lines.

As depicted in FIG. 4A, memory array 202 includes a plurality of memory cells 401. The memory cells 401 may include re-writeable memory elements, such as can be implemented using ReRAM, MRAM, PCM, or other material with a programmable resistance. The memory cells 401 may be referred to herein as programmable resistance memory cells. One type of programmable resistance memory cell is referred to as an MRAM cell, which is a memory cell that includes a MRAM memory element. The memory cells 401 may also include selector elements, such as can be implemented using an Ovonic Threshold Switch (OTS), Volatile Conductive Bridge (VCB), Metal-Insulator-Metal (MIM), or other material that provides a highly non-linear dependence of current on select voltage. The following discussion will focus on memory cells composed of an MRAM memory elements combined in series with an Ovonic Threshold switch, although much of the discussion can be applied more generally. The current in the memory cells of the first memory level is shown as flowing upward as indicated by arrow $I_{cell}$, but current can flow in either direction, as is discussed in more detail in the following.

Figure 4B:
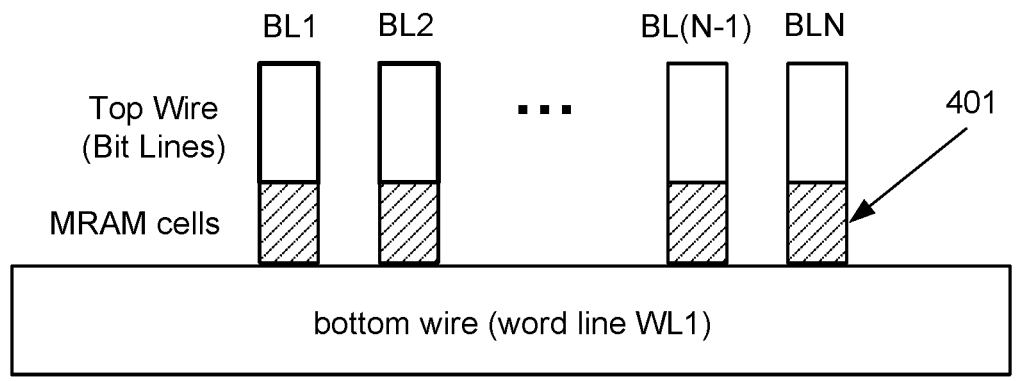
FIGS. 4B and 4C respectively present side and top views of the cross-point structure in FIG. 4A.
Figure 4C:
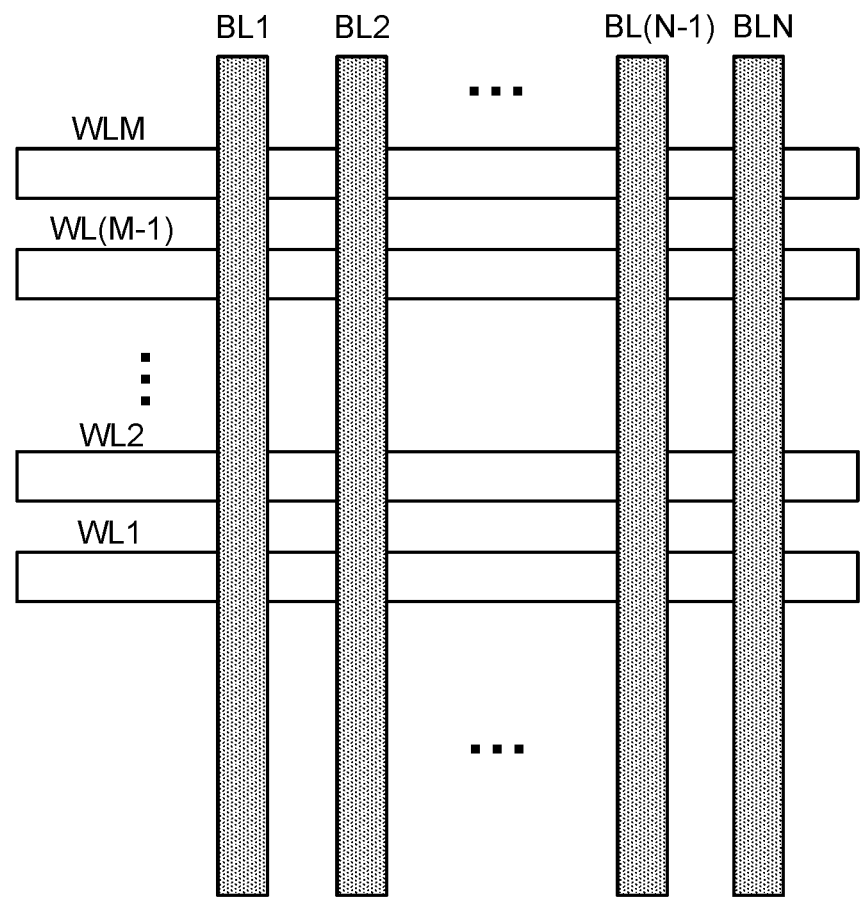

FIGS. 4B and 4C respectively present side and top views of the cross-point structure in FIG. 4A. The sideview of FIG. 4B shows one bottom wire, or word line, $WL_1$ and the top wires, or bit lines, $BL_1$-$BL_n$. At the cross-point between each top wire and bottom wire is an MRAM memory cell 401, although PCM, ReRAM, FeRAM, or other technologies can be used as the memory element. FIG. 4C is a top view illustrating the cross-point structure for M bottom wires $WL_1$-$WL_M$ and N top wires $BL_1$-$BL_N$. In a binary embodiment, the MRAM cell at each cross-point can be programmed into one of two resistance states: high and low. More detail on embodiments for an MRAM memory cell design and techniques for their reading are given below. In some embodiments, sets of these wires are arrayed continuously as a "tile," and such tiles may be paired adjacently in the Word Line (WL) direction and orthogonally in the Bit Line direction to create a module. Such a module may be composed of 2×2 tiles to form a four tile combination wherein the WL drivers between the tiles is "center driven" between the tiles with the WL running continuously over the driver at the approximate center of the line. Similarly, BL drivers may be located between the pair of tiles paired in the BL direction to be center driven, whereby the driver and its area is shared between a pair of tiles.

The cross-point array of FIG. 4A illustrates an embodiment with one layer of word lines and bits lines, with the MRAM or other memory cells sited at the intersection of the two sets of conducting lines. To increase the storage density of a memory die, multiple layers of such memory cells and conductive lines can be formed. A two-layer example is illustrated in FIG. 4D.

Figure 4D:
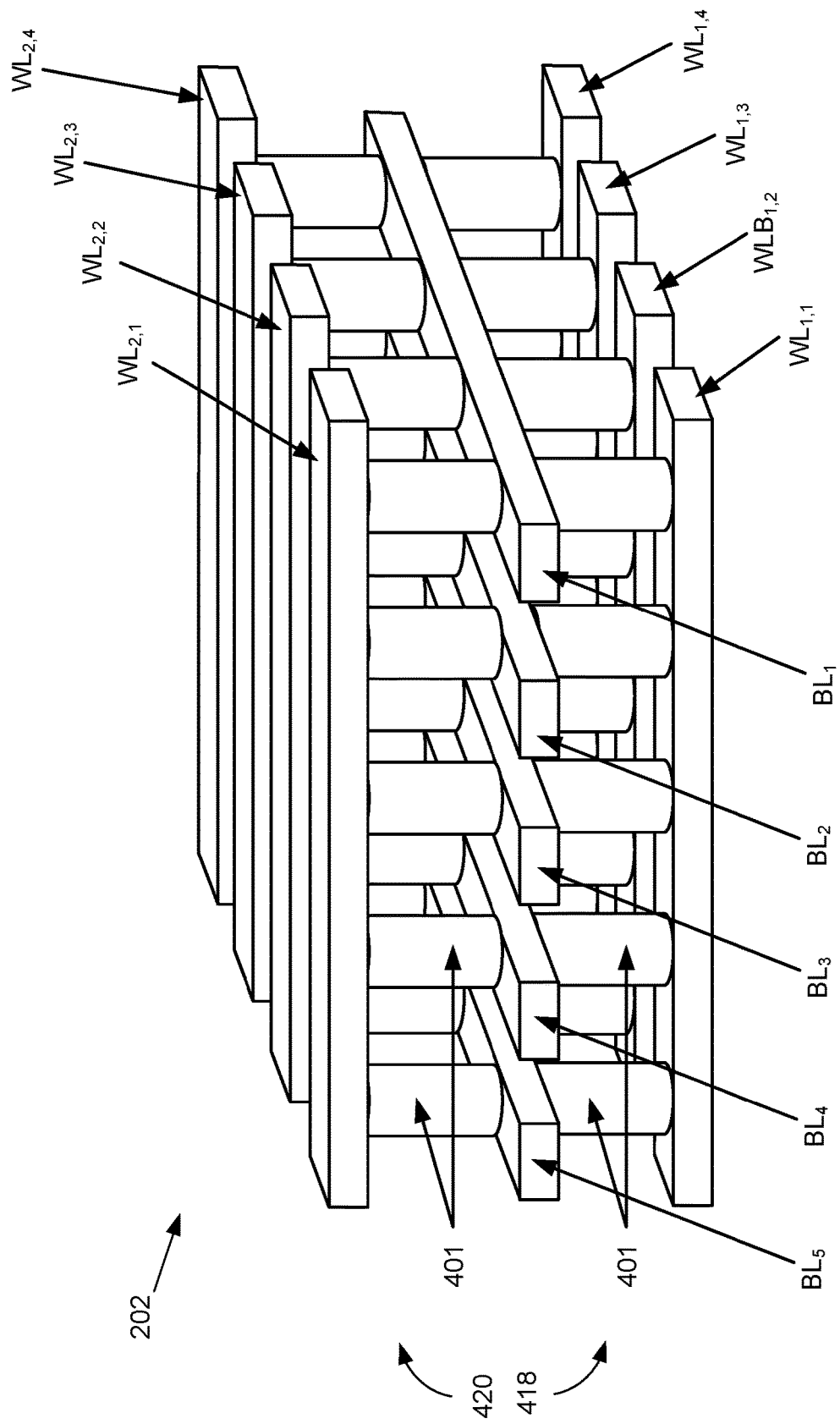
FIG. 4D depicts an embodiment of a portion of a two-level memory array that forms a cross-point architecture in an oblique view.

FIG. 4D depicts an embodiment of a portion of a two-level memory array that forms a cross-point architecture in an oblique view. As in FIG. 4A, FIG. 4D shows a first layer 418 of memory cells 401 of an array 202 connected at the cross-points of the first layer of word lines $WL_{1,1}$-$WL_{1,4}$ and bit lines $BL_1$-$BL_5$. A second layer 420 of memory cells is formed above the bit lines $BL_1$-$BL_5$ and between these bit lines and a second set of word lines $WL_{2,1}$-$WL_{2,4}$. Although FIG. 4D shows two layers, 418 and 420, of memory cells, the structure can be extended upward through additional alternating layers of word lines and bit lines. Depending on the embodiment, the word lines and bit lines of the array of FIG. 4D can be biased for read or program operations such that current in each layer flows from the word line layer to the bit line layer or the other way around. The two layers can be structured to have current flow in the same direction in each layer for a given operation or to have current flow in the opposite directions by driver selection in the positive or negative direction.

The use of a cross-point architecture allows for arrays with a small footprint and several such arrays can be formed on a single die. The memory cells formed at each cross-point can be a resistive type of memory cell, where data values are encoded as different resistance levels. Depending on the embodiment, the memory cells can be binary valued, having either a low resistance state or a high resistance state, or multi-level cells (MLCs) that can have additional resistance intermediate to the low resistance state and high resistance state. The cross-point arrays described here can be used in the memory die 292 of FIG. 2, the local memory 140 in FIG. 1, and/or the host memory 124 in FIG. 1. Resistive type memory cells can be formed according to many of the technologies mentioned above, such as ReRAM, PCM, FeRAM, or MRAM. The following discussion is presented mainly in the context of memory arrays using a cross-point architecture with binary valued MRAM memory cells, although much of the discussion is more generally applicable.

Figure 5:
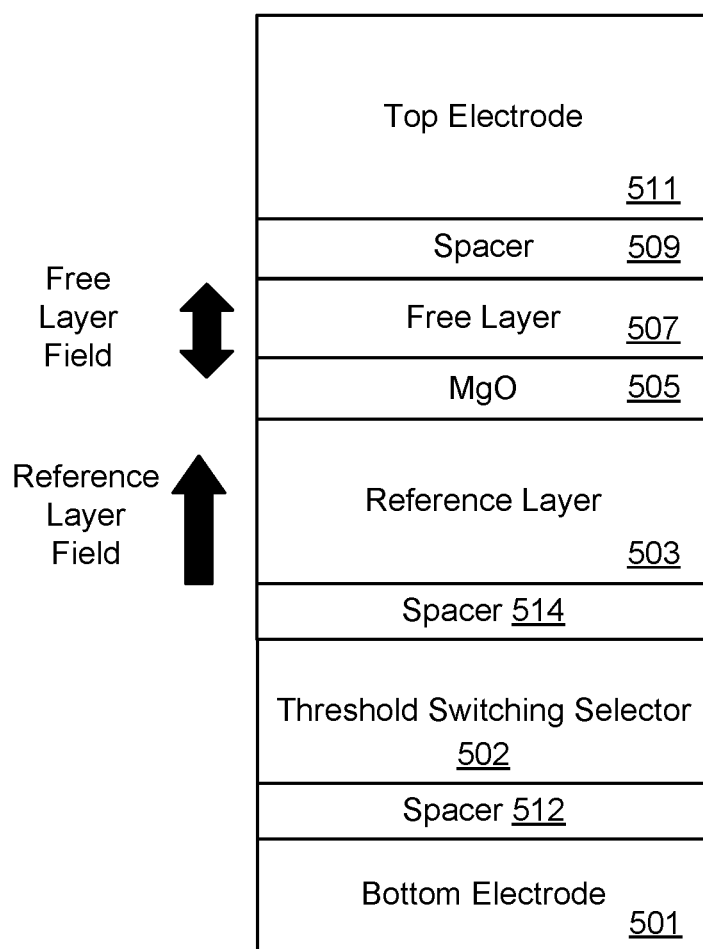
FIG. 5 illustrates an embodiment for the structure of an MRAM memory cell, here for example the selected cell is driven by a current source to read or write.

FIG. 5 illustrates the structure of an embodiment for an MRAM cell. The MRAM cell may be used as the programmable resistance memory cell 401 in, for example, FIGS. 4A-4D. The MRAM cell includes a bottom electrode 501, spacer 512, a threshold switching selector 502, spacer 514, a pair of magnetic layers (reference layer 503 and free layer 507) separated by a separation or tunneling layer of, in this example, magnesium oxide (MgO) 505, and then a top electrode 511 separated from the free layer 507 by a spacer 509. The spacer 509 can consist of an MgO capping layer in contact with the free layer 507. The spacer 509 can also contain additional metal layers. In another embodiment, the locations of the reference layer 503 and free layer 507 are switched, with the reference layer 503 on top of MgO 505, and the free layer 507 below MgO 505. In another embodiment, the location of the threshold switching selector 502 is between the free layer 507 and the top electrode 511.

In some embodiments, the bottom electrode 501 is a word line and the top electrode 511 is a bit line. In other embodiments, the bottom electrode 501 is a bit line and the top electrode 511 is a word line. The state of the memory cell is based on the relative orientation of the magnetizations of the reference layer 503 and the free layer 507: if the two layers are magnetized in the same direction, the memory cell will be in a parallel (P) low resistance state (LRS); and if they have the opposite orientation, the memory cell will be in an anti-parallel (AP) high resistance state (HRS). An MLC embodiment would include additional intermediate states. The orientation of the reference layer 503 is fixed and, in the example of FIG. 5, is oriented upward. Reference layer 503 is also known as a fixed layer or pinned layer. The reference layer 503 can be composed of multiple ferromagnetic layers coupled anti-ferromagnetically in a structure commonly referred to a synthetic anti-ferromagnet or SAF for short.

Data is written to an MRAM memory cell by programming the free layer 507 to either have the same orientation or opposite orientation of the reference layer 503. An array of MRAM memory cells may be placed in an initial, or erased, state by setting all of the MRAM memory cells to be in the low resistance state in which all of their free layers have a magnetic field orientation that is the same as their reference layers. Each of the memory cells is then selectively programmed (also referred to as "written") by placing its free layer 507 to be in the high resistance state by reversing the magnetic field to be opposite that of the reference layer 503. The reference layer 503 is formed so that it will maintain its orientation when programming the free layer 507. The reference layer 503 can have a more complicated design that includes synthetic anti-ferromagnetic layers and additional reference layers. For simplicity, the figures and discussion omit these additional layers and focus only on the fixed magnetic layer primarily responsible for tunneling magnetoresistance in the cell.

The threshold switching selector 502 has a high resistance (in an off or non-conductive state) until it is biased to a voltage higher than its threshold voltage or current above its threshold current, and until its voltage bias falls below Vhold ("Voffset") or current below Ihold. After Vt is exceeded and while Vhold is exceeded across the switching selector, the switching selector has a low resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. Accordingly, to program a memory cell at a cross-point, a voltage is applied which is sufficient to turn on the associated threshold switching selector and set or reset the memory cell; and to read a memory cell, the threshold switching selector similarly is activated by being turned on before the resistance state of the memory cell can be determined. One set of examples for a threshold switching selector is an ovonic threshold switching material of an Ovonic Threshold Switch (OTS). Example threshold switching materials include Ge—Se, Ge—Se—N, Ge—Se—As, Ge—Se—Sb—N, Ge58Se42, GeTe$_6$, Si—Te, Zn—Te, C—Te, B—Te, Ge—As—Te—Si—N, Ge—As—Se—Te—Si and Ge—Se—As—Te, with atomic percentages ranging from a few percent to more than 90 percent for each element. In an embodiment, the threshold switching selector is a two terminal device. The threshold switching selector 502 can also contain additional conducting layers on the interface with the reference layer 503. For example, spacer 514 is depicted between switching selector 502 and reference layer 503. The spacer layer 514 on the interface with reference layer 503 can be a single conducting layer or composed of multiple conducting layers. The threshold switching selector 502 can also contain additional conducting layers on the interface with the bottom electrode 501. For example, spacer 512 is depicted between switching selector 502 and reference layer 503. The spacer layer 512 on the interface with bottom electrode 501 can be a single conducting layer or composed of multiple conducting layers. Examples of conducting layers adjacent to the OTS include carbon, carbon nitride, carbon silicide, carbon tungsten, titanium, titanium nitride, tungsten, tungsten nitride, tantalum, tantalum nitride, and others. Threshold voltage switches have a Threshold Voltage (Vt) above which the resistance of the device changes substantially from insulating, or quasi insulating, to conducting.

In an embodiment, a current-force approach is used to access the MRAM cell. The current-force approach may be used to read or write the MRAM cell. In the current-force approach, an access current (e.g., $I_{read}$ or $I_{write}$) is driven through the bottom electrode 501 by a current driver. The current will be provided by a current source. The current driver may be a part of the row driver circuitry (e.g., array drivers 224) for the electrode 501. However, alternatively the current driver may a part of the column driver circuitry (e.g., driver circuitry 214) for the electrode 501. A voltage (e.g., $V_{select}$) is provided to the top electrode 511. Herein, the terms "read current" ($I_{read}$) and "write current" ($I_{write}$) will be used in connection with access currents that are driven through MRAM cells (or other programmable resistance cells). The write current may change the state of the MRAM cell. As an example, a write current of about 30 uA for 50 ns may be used for an MRAM cell with a Critical Dimension (CD) of approximately 20 nanometers with RA 10 $\Omega\mu m^2$ to switch the MRAM state from the P-state to the AP-state. Read currents may be about half the write current if applied for a limited time, such as <20 ns. A write current that flows in one direction through the MRAM cell will change an AP-state MRAM cell from the AP-state to the P-state. A write current that flows in the other direction through the MRAM cell will change a P-state MRAM cell from the P-state to the AP-state. In general, a read current will preferably be set low enough and the read duration short enough so as not to change the state of an MRAM cell from the P-state to the AP-state or from the AP-state to the P-state during read. Typically the write current required to switch the MRAM state from the P-state to the AP-state is larger in absolute magnitude than the write current required to switch the MRAM state from the AP-state to the P-state.

As discussed more fully below in connection with FIG. 7B, in some embodiments, a read current may be applied in an P2AP direction or, alternatively, in a AP2P direction. In some embodiments, the MRAM cell is read by performing an SRR (self-referenced-read). The SRR may include a first (e.g., faster but higher BER) SRR followed by an optional second (e.g., slower but lower BER) SRR if the first SRR fails. In one embodiment, the first SRR has a first read (Read1 in the P2AP direction), a first write (Write 1 to the AP-state), and a second read (Read2 in the P2AP direction). If first SRR is successful, then the original state of the cell may be restored by a second write (Write_Back to the P-state for bits initially in the P-state). However as determined by the ECC engine, if the first SRR is unsuccessful then a second SRR is performed. The second SRR has a write (Write 2 to the AP-state), and a read (Read 3 in the P2AP direction). If second SRR is successful, then the original state of the cell may be restored by a write (Write_Back to the P-state for bits initially in the P-state). In an embodiment, the success (or failure) of a SRR depends on whether an ECC codeword stored in the group of cells that are read is successfully decoded by the ECC engine and thereby any bit(s) needing correction is/are reversed.

In an embodiment, the voltage level of the memory cell due to Read1 in the P2AP direction is stored, for example on a capacitor; or by conversion to digital bits by an Analog to Digital converter and the bits stored in memory, for example in SRAM until after use in Read2 (as well as Read3, if Read3 is performed). The state stored on a capacitor can be adjusted, for example, 150 mv positive or negative by forcing a voltage on one terminal of a capacitor connected to the storage capacitor. Or the digital stored level can be adjusted by digitally adding or subtracting 150 mV to the stored bits. The 150 mV can be adjusted to be dependent on the typical bit resistance. For example, if the bit low resistance state is 25K ohms and the high resistance 50K, the difference is 25K. If the read current is 15 ua, the difference voltage between the states if 25K×15 ua=375 mV, making a choice of 150 mv acceptable but perhaps suggesting 187 mV may be more optimum, for example.

Although the foregoing describes reads in the P2AP direction and destructive writes to the AP-state (with write back to the P-state), in an alternative embodiment the first SRR has a first read (Read1 in the AP2P direction), a destructive write (Write 1 to the P-state) and a second read (Read2 in the AP2P direction). The optional second SRR has a destructive write (Write 1 to the P-state) and a second read (Read2 in the AP2P direction). The write back is to the AP-state.

In one embodiment, the MRAM cell is read by applying, for example, 0V to the top electrode 511, while driving a current of, for example, 15 micro-Amperes (µA) through the bottom electrode 501. This read current will flow from the bottom electrode 501 to the top electrode 511. Note that the read may be Read1 or Read2 in the P2AP direction. P2AP means current flows in the direction that would write the bit from P to AP or AP to AP. In some embodiments, data is written to the MRAM cell using a bipolar write operation. In one embodiment, the MRAM cell is written from the AP-state to the P-state by applying, for example, 3V to the top electrode 511, while driving a write current of, for example, −30 µA through the bottom electrode 501. This write current will flow from the top electrode 511 to the bottom electrode 501. In one embodiment, the MRAM cell is written from the P-state to the AP-state by applying, for example, 0V to the top electrode 511, while driving a current of, for example, 30 µA through the bottom electrode 501. This write current will flow from electrode 501 to the electrode 511.

As an alternative to the approach in FIG. 5, the select voltage can be applied to the bottom electrode 501 with the access current applied through the top electrode 511. In one such embodiment, the MRAM cell is read by applying, for example, 3V to the bottom electrode 501, while driving a read current of, for example, −15 µA through the top electrode 511. This read current will flow from the bottom electrode 501 to the top electrode 511.

In one embodiment, the MRAM cell is written from the AP-state to the P-state by applying, for example, −3V to the bottom electrode 501, while driving a write current of, for example, 30 µA through the top electrode 511. The electron current will flow from the bottom electrode 501 to the top electrode 511. In one embodiment, the MRAM cell is written from the P-state to the AP-state by applying, for example, 0V to the bottom electrode 501, while driving a current of, for example, −30 µA through the top electrode 511. The electron current will flow from the top electrode 511 to the bottom electrode 501. In this discussion it is also understood that the direction of the current polarity to switch the magnetization of the bit into the P or AP state can vary based on reference layer design and the location of the reference layer with respect the free layer.

Figure 6:
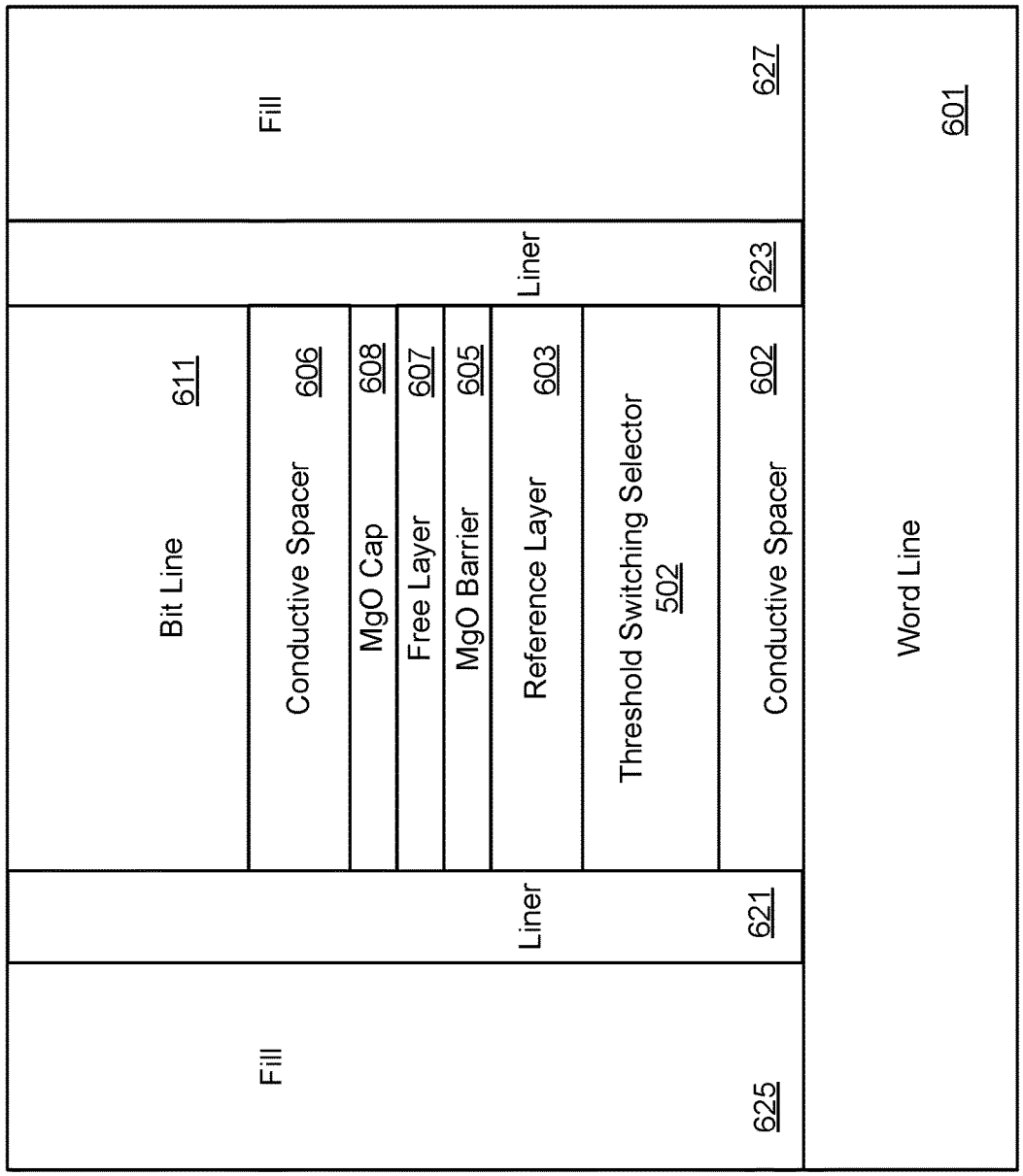
FIG. 6 illustrates an embodiment for an MRAM memory cell design as it would be implemented in a cross-point array in more detail.

FIG. 6 illustrates an embodiment for an MRAM memory cell design as it may be implemented in a cross-point array in more detail. When placed in a cross-point array, the top and bottom electrodes of the MRAM memory cells will be the top and bottom wires of the array. In the embodiment shown here, the bottom electrode is the word line 601 and the top electrode is the bit line 611 of the memory cell, but these can be reversed in other embodiments. Between the word line 601 and bit line 611 are the reference layer 603 and free layer 607, which are again separated MgO barrier 605. In the embodiment shown in FIG. 6, an MgO cap 608 is also formed on top of the free layer 607 and a conductive spacer 606 is formed between the bit line 611 and the MgO cap 608. The reference layer 603 is separated from the word line 601 by another conductive spacer 602. A threshold switching selector 502 may reside between the reference layer 603 and the conductive spacer 602. On either side of the memory cell structure is a liner 621 and 623, where these can be part of the same structure, but appear separate in the cross-section of FIG. 6. To either side of the liner 621, 623 is shown some of fill material 625, 627 used to fill in the otherwise empty regions of the cross-point structure.

With respect to the free layer design 607, embodiments include CoFe or CoFeB Alloy with a thickness on the order ~1-2 nm, where an Ir layer can be interspersed in the free layer close to MgO barrier 605 and the free layer 607 can be doped or interspersed with Ta, W, or Mo. Embodiments for the reference layer 603 can include a bilayer of CoFeB and Co/Pt multilayer coupled with an Ir or Ru spacer, or a combination or alloy of both 602. The MgO cap 608 is optional but can be used to increase anisotropy and reduce the critical switching current of free layer 607. The conductive spacers can be conductive metals such as Ta, W, Ru, CN, TiN, and TaN, among others. The free-layer can also be a composite free layer composed of multiple free-layers with conductive layers in between, such as W, Ta, W, or tunneling layers in between, such as MgO.

Figure 7A:
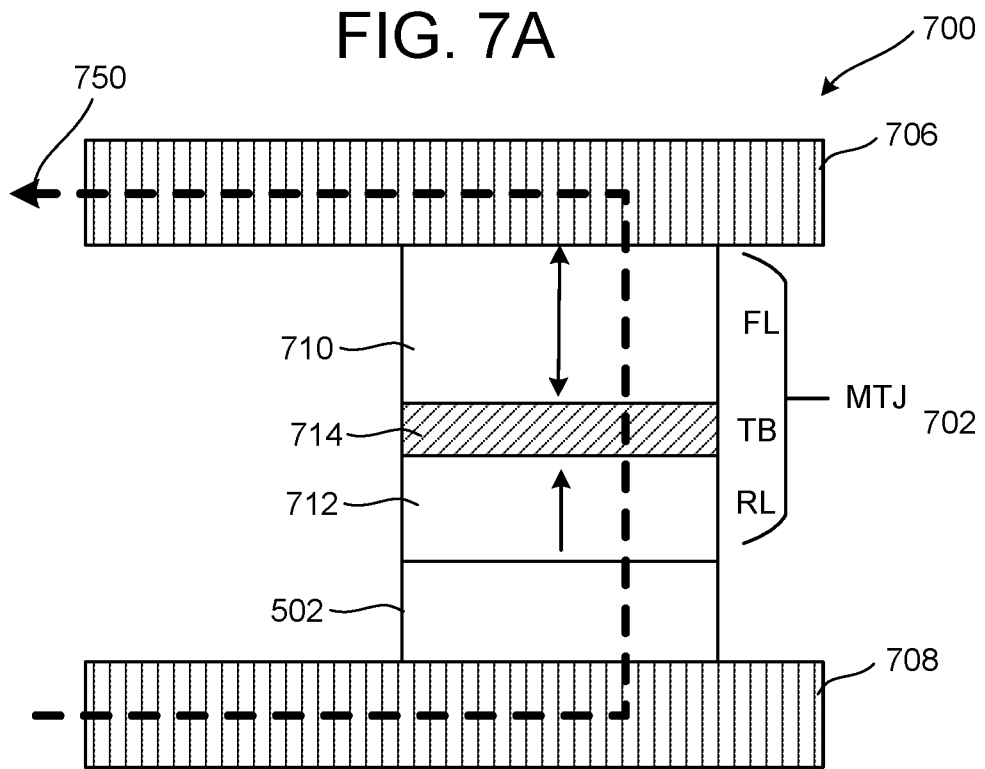
FIGS. 7A and 7B illustrate the writing of an MRAM memory cell by flowing current that generates spin transfer torque (STT).

The following discussion will mainly be discussed with respect to a perpendicular spin transfer torque MRAM memory cell, where the free layer 507/607 of FIGS. 5 and 6 comprises a switchable direction of magnetization that is perpendicular to the plane of the free layer. Spin transfer torque ("STT") is an effect in which the orientation of a magnetic layer in a magnetic tunnel junction (MJT) can be modified using a spin-polarized current. Charge carriers (such as electrons) have a property known as spin which is a small quantity of angular momentum intrinsic to the carrier. An electric current is generally unpolarized (e.g., consisting of 50% spin-up and 50% spin-down electrons). A spin polarized current is one with more electrons of either spin (e.g., a majority of spin-up electrons or a majority of spin-down electrons). By passing a current through a thick magnetic layer (the reference layer), a spin-polarized current can be produced. If this spin-polarized current is injected into a second magnetic layer (the free layer), angular momentum can be transferred to this second magnetic layer, changing the direction of magnetization of the second magnetic layer. This is referred to as spin transfer torque. FIGS. 7A and 7B illustrate the use of spin transfer torque to program or write to MRAM memory. Spin transfer torque magnetic random access memory (STT MRAM) has the advantages of lower power consumption and better scalability over other MRAM variations. Compared to other MRAM implementations, such as toggle MRAM, the STT switching technique requires relatively low power, virtually eliminates the problem of adjacent bit disturbs, and has more favorable scaling for higher memory cell densities (reduced MRAM cell size). The latter issue also favors STT MRAM where the free and reference layer magnetizations are orientated perpendicular to the film plane, rather than in-plane.

Figure 7B:
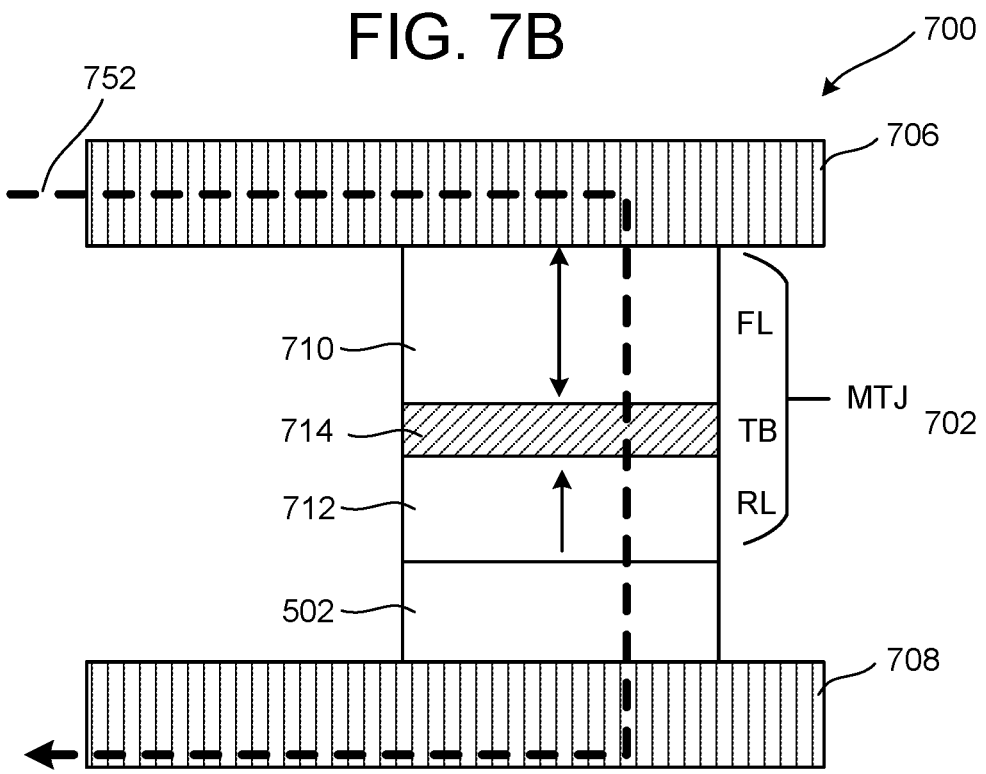

As the STT phenomenon is more easily described in terms electron behavior, FIGS. 7A and 7B and their discussion is given in terms of electron current, where the direction of the write current is defined as the direction of the electron flow. Therefore, the term write current in reference to FIGS. 7A and 7B refers to an electron current. As electrons are negatively charged, the electron current will be in the opposite direction from the conventionally defined current, so that an electron current will flow from a lower voltage level towards a higher voltage level instead the conventional current flow of from a higher voltage level to a lower voltage level.

FIGS. 7A and 7B illustrate the writing of an MRAM memory cell by the STT mechanism, depicting a simplified schematic representation of an example of an STT-switching MRAM memory cell 700 in which both the reference and free layer magnetization are in a perpendicular direction. Memory cell 700 includes a magnetic tunnel junction (MTJ) 702 comprising an upper ferromagnetic layer 710, a lower ferromagnetic layer 712, and a tunnel barrier (TB) 714 as an insulating layer between the two ferromagnetic layers. In this example, upper ferromagnetic layer 710 is the free layer FL and the direction of its magnetization can be switched. Lower ferromagnetic layer 712 is the reference (or fixed) layer RL and the direction of its magnetization cannot be switched. When the magnetization in free layer 710 is parallel to the magnetization in reference layer RL 712, the resistance across the memory cell 700 is relatively low. When the magnetization in free layer FL 710 is anti-parallel to the magnetization in reference layer RL 712, the resistance across memory cell 700 is relatively high. The data ("0" or "1") in memory cell 700 is read by measuring the resistance of the memory cell 700, such as by forcing. In this regard, electrical conductors 706/708 attached to memory cell 700 are utilized to read the MRAM data. By design, both the parallel and antiparallel configurations remain stable in the quiescent state and/or during a read operation (at sufficiently low read current).

For both the reference layer RL 712 and free layer FL 710, the direction of magnetization is in the perpendicular direction (i.e. perpendicular to the plane defined by the free layer and perpendicular to the plane defined by the reference layer). FIGS. 7A and 7B show the direction of magnetization of reference layer RL 712 as up and the direction of magnetization of free layer FL 710 as switchable between up and down, which is perpendicular to the plane.

In one embodiment, tunnel barrier 714 is made of Magnesium Oxide (MgO); however, other materials can also be used. Free layer 710 is a ferromagnetic metal that possess the ability to change/switch its direction of magnetization. Multilayers based on transition metals like Co, Fe and their alloys can be used to form free layer 710. In one embodiment, free layer 710 comprises an alloy of Cobalt, Iron and Boron. Reference layer 712 can be many different types of materials including (but not limited to) multiple layers of Cobalt and Platinum and/or an alloy of Cobalt and Iron.

To "set" the MRAM memory cell bit value (i.e., choose the direction of the free layer magnetization), an electron current 750 is applied from conductor 708 to conductor 706, as depicted in FIG. 7A (hence current flows in the opposite direction). To generate the electron current 750, the top conductor 706 is placed at a higher voltage level than bottom conductor 708, due the negative charge of the electron. The electrons in the electron current 750 become spin-polarized as they pass through reference layer 712 because reference layer 712 is a ferromagnetic metal. When the spin-polarized electrons tunnel across the tunnel barrier 714, conservation of angular momentum can result in the imparting of a spin transfer torque on both free layer 710 and reference layer 712, but this torque is inadequate (by design) to affect the magnetization direction of the reference layer 712. Contrastingly, this spin transfer torque is (by design) sufficient to switch the magnetization orientation in the free layer 710 to become parallel (P) to that of the reference layer 712 if the initial magnetization orientation of the free layer 710 was anti-parallel (AP) to the reference layer 712, referred to as an anti-parallel-to-parallel (AP2P) write. The parallel magnetizations will then remain stable before and after such electron current is turned off.

In contrast, if free layer 710 and reference layer 712 magnetizations are initially parallel, the direction of magnetization of free layer 710 can be switched to become antiparallel to the reference layer 712 by application of an electron current of opposite direction to the aforementioned case. For example, electron current 752 is applied from conductor 706 to conductor 708, as depicted in FIG. 7B, by placing the higher voltage level on the lower conductor 708. This will write a free layer 710 in a P state to an AP state, referred to as a parallel-to-anti-parallel (P2AP) write. Thus, by way of the same STT physics, the direction of the magnetization of free layer 710 can be deterministically set into either of two stable orientations by judicious choice of the electron current direction (polarity).

The data ("0" or "1") in memory cell 700 can read by measuring the resistance of the memory cell 700. Low resistance typically represents a "0" bit and high resistance typically represents a "1" bit, although sometimes the alternate convention occurs. A read current can be applied across the memory cell (e.g., across the MJT 702) by applying an electron current from conductor 708 to conductor 706, flowing as shown for 750 in FIG. 7A (the "AP2P direction");

alternatively, the electron current can be applied from conductor 706 to conductor 708, flowing as shown for 752 in FIG. 7B (the "P2AP direction"). As is well-understood, the electron current flows in the opposite direction as conventionally defined current. In a read operation, if the electron current is too high, this can disturb data stored in a memory cell and change its state. For example, if electron current Read1 uses the P2AP direction of FIG. 7B, too high of a current or voltage level can switch any memory cells in the low resistance P state into the high resistance AP state before the bit voltage during Read1 is stored. Consequently, although the MRAM memory cell can be read in either direction, the directional nature of the write operation may make one read direction preferable over the other in various embodiments. For example, for a given read current, the error rate may be less performing SRR in the P2AP direction.

Although the discussion of FIGS. 7A and 7B was in the context of electron current for the read and write currents, the subsequent discussion will be in the context of conventional current unless otherwise specified.

Whether to read or write selected memory cells in the array structures of FIGS. 4A-4D, the bit line and word line corresponding a selected memory cell is biased to place a voltage across the selected memory cell, or a current through, and induce the flow of electrons as illustrated with respect to FIG. 7A or 7B. Note that herein, a "selected memory cell" means that the memory cell is selected for access (e.g., read access, write access). An "unselected memory cell" means that the memory cell is not selected for access by, for example, placing either its WL or BL or both at a voltage approximately midway between the maximum positive and minimum negative voltages across the memory cell. A given process may result in write currents that are about the same for forward versus reverse write of the MRAM, or it may be that writing from low resistance state (LRS) to high resistance state (HRS) requires 20% or more current for a CD of approximately 20 nm and RA10 $\Omega\mu m^2$.

Some biasing techniques may result in voltage across non-selected memory cells of the array, which can induce currents in non-selected memory cells. Although this wasted power consumption can be mitigated to some degree by designing the memory cells to have relatively high resistance levels for both high and low resistance states, this will still result in increased current and power consumption as well as placing additional design constraints on the design of the memory cells and the array. One approach to address this unwanted current leakage is to place a selector element in series with each MRAM or other resistive (e.g., ReRAM, PCM) memory cell. For example, a select transistor can be placed in series with each resistive memory cell element in FIGS. 4A-4D so that the memory cells 401 is now a composite of a select transistor and a programmable resistance. Such an architecture may be referred to as 1T1R. In some embodiments, the memory system performs a fast SRR as disclosed herein to read memory cells having a select transistor and a programmable resistance. Use of a select transistor, however, requires the introduction of additional control lines and cell area to be able to turn on the corresponding transistor of a selected memory cell. Additionally, transistors will often not scale in the same manner as the resistive memory element write current, so that as memory arrays move to smaller sizes the use of transistor based selectors can be a limiting factor in reducing cost, for example. An alternate approach to select transistors is the use of a threshold switching selector (e.g., threshold switching selector 502) in series with the programmable resistive element. A two terminal threshold switching selector does not require the aforementioned additional control lines and cell area to be able to turn on the corresponding select transistor of a selected memory cell. In some embodiments, the memory system performs a fast SRR as disclosed herein to read memory cells having a two terminal threshold switching selector in series with a programmable resistance element.

Figure 8A:
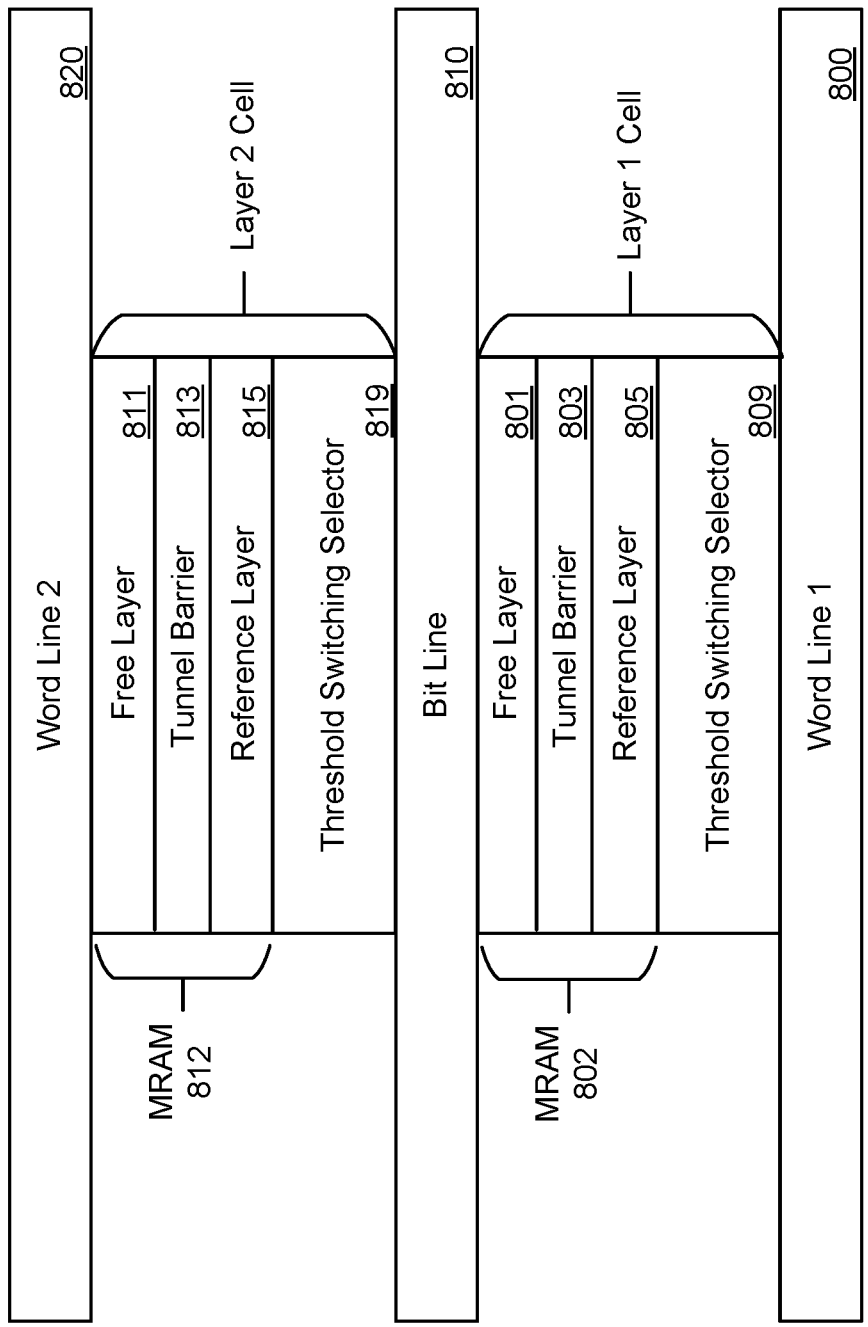
FIGS. 8A and 8B illustrate embodiments for the incorporation of threshold switching selectors into an MRAM memory array having a cross-point architecture.
Figure 8B:
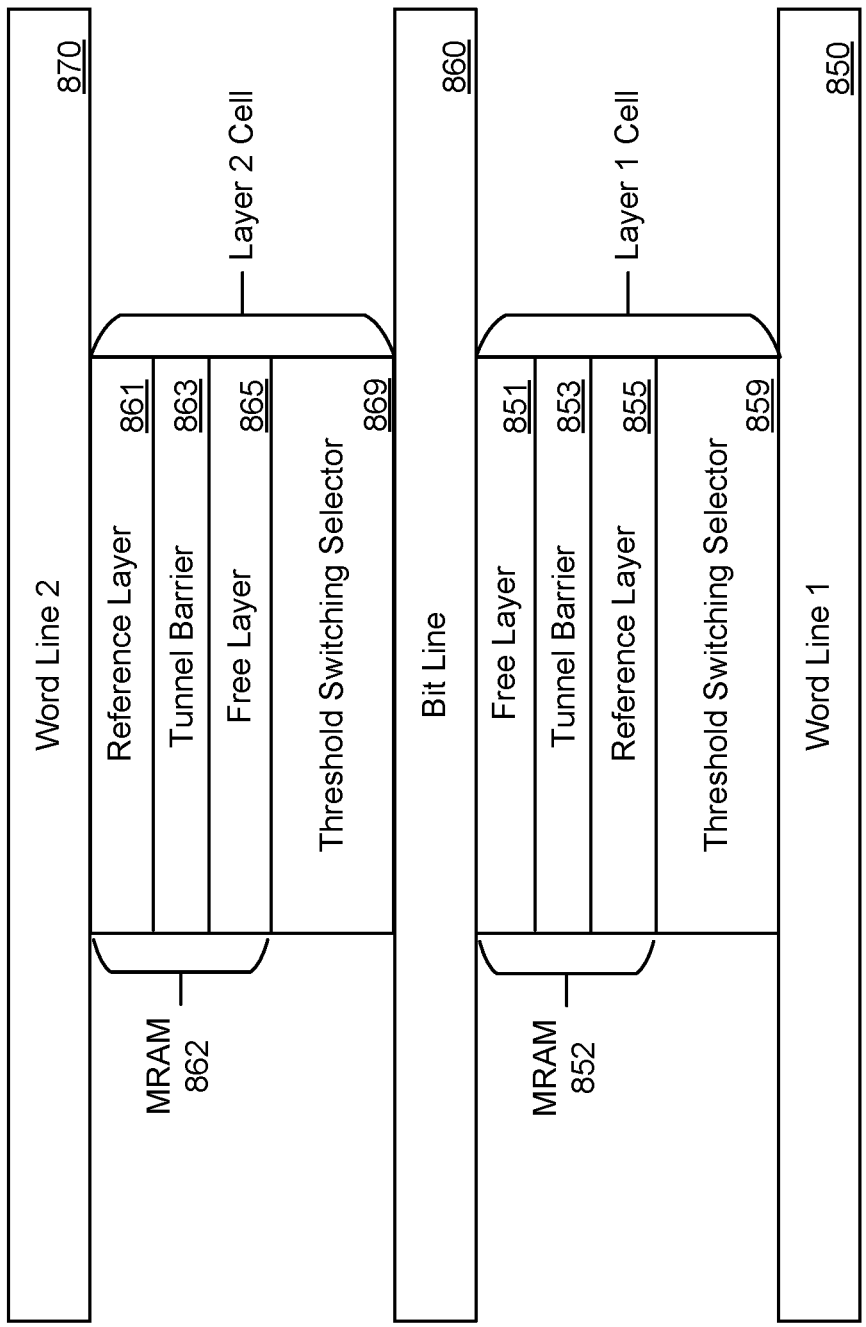

FIGS. 8A and 8B illustrate embodiments for the incorporation of threshold switching selectors into an MRAM memory array having a cross-point architecture. The examples of FIGS. 8A and 8B show two MRAM cells (Layer 1 Cell, Layer 2 Cell) in a two layer cross-point array, such as shown in FIG. 4D, but in a side view. Keeping the orientation of the MRAM layers the same in the Layer 1 Cell and the Layer 2 Cell, as depicted in FIG. 8A, allows the fabrication process to be the same for each layer. FIGS. 8A and 8B show a lower first conducting line of word line 1 800, an upper first conducting line of word line 2 820, and an intermediate second conducting line of bit line 810. In these figures, all of these lines are shown running left to right across the page for ease of presentation, but in a cross-point array they would be more accurately represented as in the oblique view of FIG. 4D where the word lines, or first conducting lines or wires, run in one direction parallel to the surface of the underlying substrate and the bit lines, or second conducting lines or wires, run in a second direction parallel to the surface to the substrate that is largely orthogonal to the first direction. The MRAM memory cells are also represented in a simplified form, showing only the reference layer, free layer, and the intermediate tunnel barrier, but in an actual implementation would typically include the additional structure described above with respect to FIGS. 5 and 6.

An MRAM element 802 including free layer 801, tunnel barrier 803, and reference layer 805 is formed above the threshold switching selector 809, where this series combination of the MRAM element 802 and the threshold switching selector 809 together form the layer 1 cell between the bit line 810 and word line 1 800. The series combination of the MRAM element 802 and the threshold switching selector 809 operate largely as described above with respect to FIGS. 7A and 7B when the threshold switching selector 809 is turned on. Initially, though, the threshold switching selector 809 needs to be turned on by applying a voltage above the threshold voltage $V_{th}$ of the threshold switching selector 809, and then the biasing current or voltage needs to be maintained high enough above the holding current or holding voltage of the threshold switching selector 809 so that it stays on during the subsequent read or write operation.

On the second layer, an MRAM element 812 includes free layer 811, tunnel barrier 813, and reference layer 815 is formed above the threshold switching selector 819, with the series combination of the MRAM element 812 and the threshold switching selector 819 together forming the layer 2 cell between the bit line 810 and word line 2 820. The layer 2 cell will operate as for the layer 1 cell, although the lower conductor now corresponds to a bit line 810 and the upper conductor is now a word line, word line 2 820. Additional paired layers may similarly share another bit line between them, having a pattern of WL1, BL1, WL2; WL3, BL2, WL4; or have separate bit lines in a pattern such as WL1, BL1, WL2, BL2.

In the embodiment of FIG. 8A, the threshold switching selector 809/819 is formed below the MRAM element 802/812, but in alternate embodiments the threshold switching selector can be formed above the MRAM element for one or both layers. As discussed with respect to FIGS. 7A and 7B, the MRAM memory cell is directional. In FIG. 8A, the MRAM elements 802 and 812 have the same orientation, with the free layer 801/811 above (relative to the unshown substrate) the reference layer 805/815. Forming the layers between the conductive lines with the same structure can have a number of advantages, particularly with respect to processing as each of the two layers, as well as subsequent layers in embodiments with more layers, can be formed according to the same processing sequence.

FIG. 8B illustrates an alternate embodiment that is arranged similarly to that of FIG. 8A, except that in the layer 2 cell the locations of the reference layer and free layer are reversed. More specifically, between word line 1 850 and bit line 860, as in FIG. 8A the layer cell 1 includes an MRAM element 1 having a free layer 851 formed over tunnel barrier 853, that is turn formed over the reference layer 855, with the MRAM element 852 formed over the threshold switching selector 859. The second layer of the embodiment of FIG. 8B again has an MRAM element 862 formed over a threshold switching selector 869 between the bit line 860 and word line 2 870, but, relative to FIG. 8A, with the MRAM element 862 inverted, having the reference layer 861 now formed above the tunnel barrier 863 and the free layer 865 now under the tunnel barrier 863. Alternatively, the configuration of MRAM element 862 may be used for the Layer 1 cell and the configuration of MRAM cell 852 may be used for the Layer 2 cell.

Although the embodiment of FIG. 8B requires a different processing sequence for the forming of layers, in some embodiments it can have advantages. In particular, the directionality of the MRAM structure can make the embodiment of FIG. 8B attractive since when writing or reading in the same direction (with respect to the reference and free layers) the bit line will be biased the same for both the lower layer and the upper layer, and both word lines will be biased the same. For example, if both layer 1 and layer 2 memory cells are sensed in the P2AP direction (with respect to the reference and free layers), the bit line layer 860 will be biased such as in the P2AP direction, the bit line 860 is biased low (e.g., 0V) for both the upper and lower cell, with word line 1 850 and word line 2 870 both biased to a higher voltage level. Similarly, with respect to writing, for writing to the high resistance AP state the bit line 860 is biased low (e.g., 0V) for both the upper and lower cell, with word line 1 850 and word line 2 870 both biased to a higher voltage level.

To either read data from or write data to an MRAM memory cell involves passing a current through the memory cell. In embodiments where a threshold switching selector is placed in series with the MRAM element, before the current can pass through the MRAM element the threshold switching selector needs to be turned on by applying a sufficient voltage across and current through the series combination of the threshold switching selector and the MRAM element.

Figure 9:
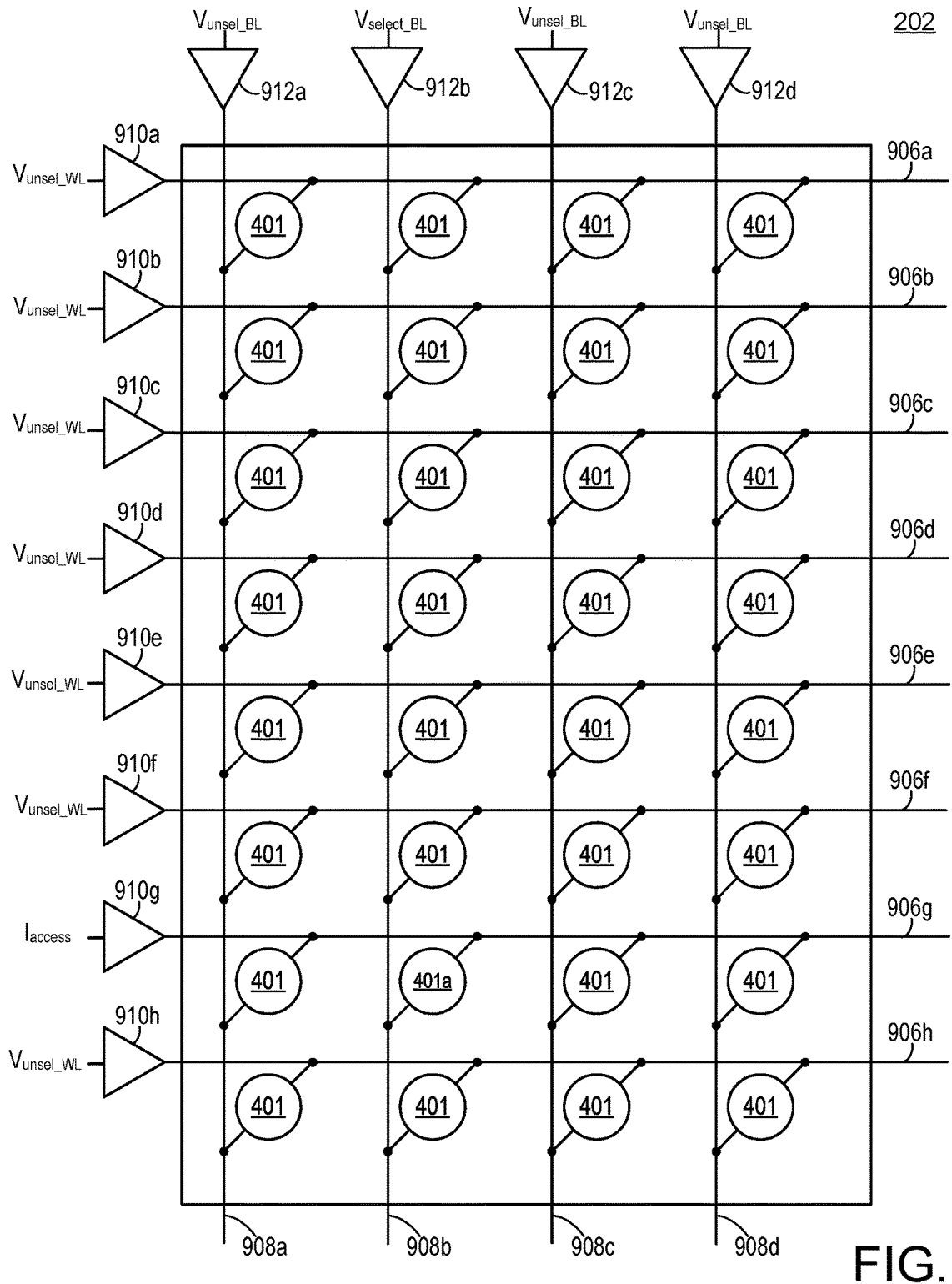
FIG. 9 depicts an embodiment of a memory array having a cross-point architecture that is accessed using a forced-current approach.

FIG. 9 depicts an embodiment of a memory array 202 having a cross-point architecture. The array 202 has a set of first conductive lines 906a-906h and a set of second conductive lines 908a-908d. In one embodiment, the set of first conductive lines 906a-906h are word lines and the set of second conductive lines 908a-908b are bit lines. For ease of discussion, the set of first conductive lines 906a-906h may be referred to as word lines and the set of second conductive lines 908a-908b may be referred to as bit lines. However, the set of first conductive lines 906a-906h could be bit lines and the set of second conductive lines 908a-908b could be word lines.

The array 202 has a number of programmable resistance memory cells 401. Each memory cell 401 is connected between one of the first conductive lines 906 and one of the second conductive lines 908. In one embodiment, each memory cell 401 has a magnetoresistive random access memory (MRAM) element in series with a threshold switching selector element. The threshold switching selector 502 is configured to become conductive with lower resistance in response to application of a voltage level exceeding a threshold voltage of the threshold switching selector 502, and remains conductive with lower resistance until the current through the switching selector 502 is reduced below the selector holding current, Ihold. The threshold switching selector element 502 may be a two terminal device. In an embodiment, the threshold switching selector element 502 comprises an OTS.

Each first conductive line 906 may be driven by one of the WL drivers 910a-910h. For example, first conductive line 906a may be driven by WL driver 910a, first conductive line 906b may be driven by WL driver 910b, etc. Each second conductive line 908 is driven by one of the BL drivers 912a-912d. For example, second conductive line 908a is driven by BL driver 912a, second conductive line 908b is driven by BL driver 912b, etc. In one embodiment, the word lines and the bit lines are driven from one end of the word line or bit line. FIG. 9 depicts such an embodiment in which the word lines and the bit lines are driven from one end. In an alternative embodiment, the bit lines and/or the word lines are driven from a midpoint.

Although a separate driver 910 is depicted connected to each word line 906, it is not required to have a separate driver 910 for each word line. A driver may be connected to the selected word line by decode circuitry that selects the WL 906 to be driven. However, locations of WL drivers 910a-910h in FIG. 9 may still indicate the location (e.g., end) of the word line that is driven.

For purpose of discussion, memory cell 401a is being selected for access. This could be a read or a write access. Selected memory cell 401a is at the cross-point of selected word line 906g and selected bit line 908b. To select a memory cell 401, a select voltage ($V_{select\_BL}$) such as near ground is provided to the selected bit line (e.g., bit line 908b) and an access current ($I_{access}$) is driven (or forced) through a selected word line (e.g., word line 906g). The access current may flow between a portion of the selected word line 906g, through the selected memory cell 401a, and through a portion of the selected bit line 908b. A selected word line means that that word line is connected to at least one selected memory cell. The selected word line will typically be connected to one or more unselected memory cells. A selected bit line means that that bit line is connected to at least one selected memory cell. The selected bit line will typically be connected to one or more unselected memory cells. A selected memory cell is connected between a selected word line and a selected bit line.

In one embodiment, $V_{select\_BL}$ has a magnitude such that the threshold switching selector 502 in a selected memory cell will turn on, assuming that $I_{access}$ is applied to the selected word line. For example, $V_{select\_BL}$ may be approximately 0V. On the other hand, $V_{unsel\_BL}$ has a magnitude such that the threshold switching selector 502 in an unselected memory cell will not turn on, for example $V_{select\_BL}$ may be approximately 1.65V if the positive power supply is 3.3V. Word line driver 910g drives an access current ($I_{access}$) through at least a portion of selected word line 906g. This access current may also flow through the selected memory cell 401a and in a portion of selected bit line 908b. Such a selected WL may, for example, be driven high by 15 μa to read or 30 μa to write by a current source with compliance voltage of, for example, 3.3V. To write the opposite polarity, the selected word line is forced, for example, with −30 μa and the selected bit line to 3.3V.

The other memory cells are not selected for access (i.e., are unselected memory cells). An unselected memory cell means that the memory cell is not presently selected for access (e.g., read or write). An unselected word line is only connected to unselected memory cells. An unselected bit line is only connected to unselected memory cells. Word lines and bit lines that are not selected are referred to as unselected word lines or unselected bit lines, respectively. In one embodiment, a word lines or bit lines may be unselected by forcing them to an unselect voltage, such as Vmid, for example 1.65V, at approximately one half the drive compliance voltage, for example 3.3V. An unselect voltage ($V_{unsel\_BL}$) is provided to the unselected bit lines (e.g., bit lines 908a, 908c, 908d). An unselect voltage ($V_{unsel\_WL}$) is provided to the unselected word lines (e.g., word lines 910a, 910b, 910c, 910d, 910e, 910f, and 910h).

The WL drivers 910 are configured to either source a current or sink a current. Thus, $I_{access}$ could flow in either direction through the selected word line (as well as the selected bit line). By convention used herein, when a current driver 910 is used as a current source the magnitude of the access current is positive. By convention used herein, when a current driver 910 is used as a current sink the magnitude of the access current is negative. Whether a current driver 910 sources or sinks a current, herein this will be referred to as forcing or driving the current to or through the selected word line. In one embodiment, no current other than leakage is forced through unselected word lines (e.g., 906a, 906b, 906c, 906d, 906e, 906f, and 906h).

In the example of FIG. 9 there are more word lines than bit lines in the cross-point array. In one embodiment, there are more bit lines than word lines in the cross-point array. In one embodiment, the number of bit lines equals the number of word lines in the cross-point array. In the example of FIG. 9 there are twice as many word lines as bit lines in the cross-point array; however, a different ratio could be used. Thereby, different tile sizes may be realized. For example, a tile may have 1024 BL by 2048 WL, which may be composed into a module of 2048×4096 cells by center driving the WL and BL between the four tiles. In one embodiment, SRR is performed on a group of memory cell by, for example, selecting one memory cell in each of a number of tiles. In some embodiments, more than one memory cell from a tile may be selected for SRR.

In some embodiments, a current-force approach is used to access memory cells in a cross-point memory array. Threshold switching selectors may be used in series with the memory cells. The threshold switching selector may be connected in series with the memory element between the word line and the bit line. Hence, any voltage across the switching selector will reduce the voltage across the memory element. Typically, there will be some variation in the offset or hold voltage between the switching selectors. A current-force approach helps to mitigate offset voltage variation between threshold switching selectors to help minimize the selected cell current variation cell to cell. In one embodiment, a voltage-force approach is used to access memory cells in a cross-point memory array. In an embodiment of a voltage-force SRR rather than forcing $I_{access}$ to the selected word line 906g, a select voltage is applied to the selected word line 906g, thereby creating a target voltage across the selected memory cell 401a.

Figure 10A:
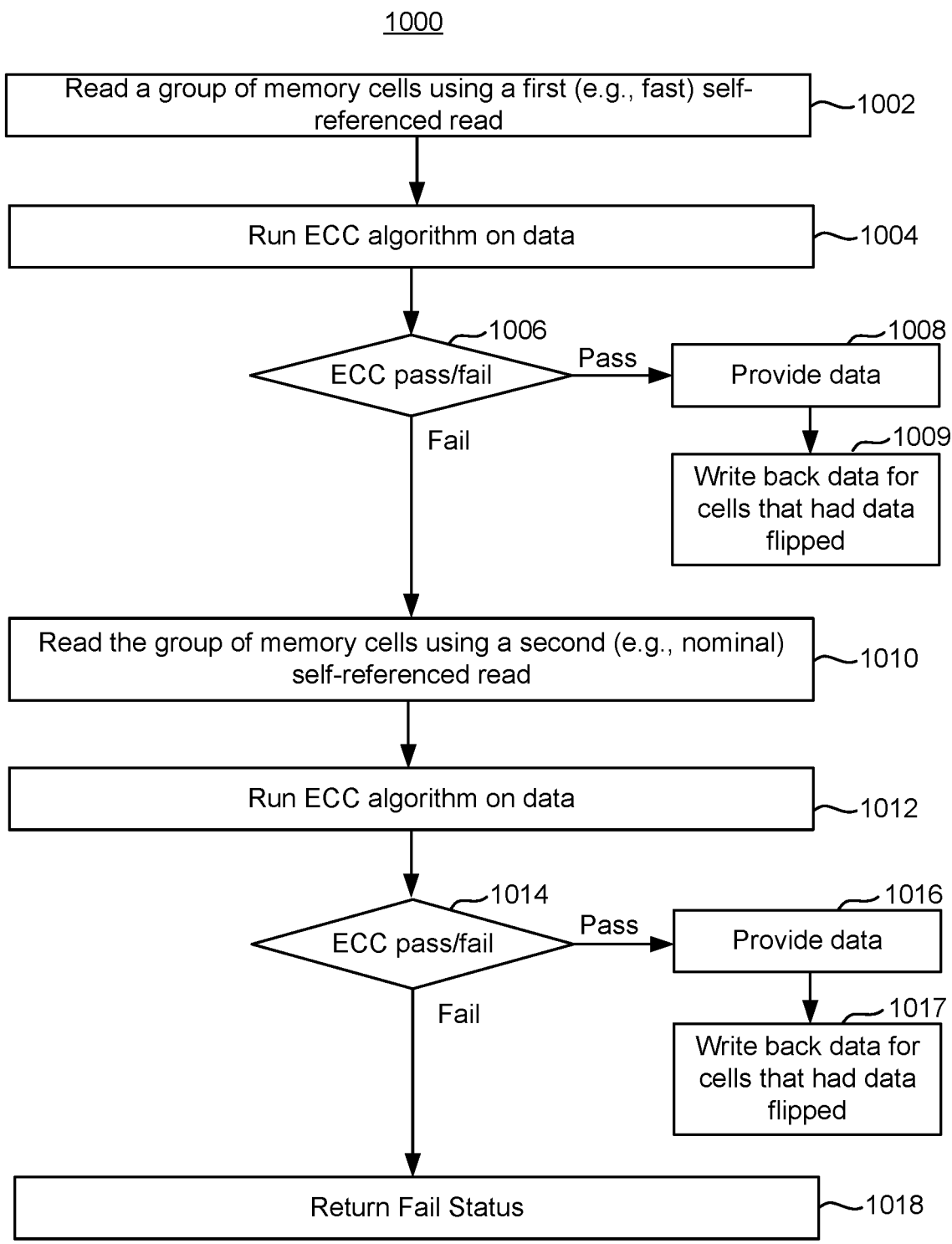
FIG. 10A is a flowchart of one embodiment of a process of reading programmable resistance memory cells.

FIG. 10A is a flowchart of one embodiment of a process 1000 of reading programmable resistance memory cells with a fast SRR. In one embodiment a group of memory cells that stores an ECC codeword is read. In one embodiment a group of memory cells reside in different tiles of a cross-point array. In one embodiment the memory cells are MRAM cells. In one embodiment, the memory cells each have a programmable resistance memory element in series with a threshold switching selector (e.g., OTS). In one embodiment, a forced-current approach is used. In one embodiment, a forced-voltage approach is used. The data can be provided to a host 120 or other requestor such as, but not limited to, memory controller 102.

Step 1002 includes reading the group of the programmable resistance memory cells using a fast SRR. In one embodiment, the fast SRR includes a first read operation of each memory cell followed by a first write operation to each memory cell followed by a second read operation of each memory cell. In one embodiment, the first SRR includes applying a first sequence of signals to the memory cells. The first sequence of signals may include a first read signal (Read1) applied to the memory cells followed by a first write signal (Write1) applied to the memory cells followed by a second read signal (Read2) applied to the memory cells. In one embodiment, each of these signals has the same polarity. In one embodiment, each of these signals includes an access current (see, for example, $I_{access}$ in FIG. 9). In one embodiment, each of these signals includes a select voltage applied to the selected memory cell (for example, a select voltage applied to a selected word line). Additionally a write-back sequence may be applied to restore the bit to its initial state. For MRAM, this may use reversed voltages across the BL and WL.

Step 1004 includes running an ECC algorithm on the data read using the fast self-referenced read. Step 1004 may be performed on the same die that has the memory cells or off-die. In one embodiment, step 1004 is performed by on die ECC engine 269 (see FIG. 2 or 3). In one embodiment, step 1004 is performed by off-die by ECC engine 158 (see FIG. 1).

Step 1006 includes a determination of whether the ECC algorithm passed or failed. If a codeword stored in the group is successfully decoded (e.g., all errors corrected) then the ECC passes. If ECC passes then the data is provided to a host 120 or other requestor in step 1008. In an embodiment, the fast SRR is a destructive read. Therefore, the original state of the memory cell may be restored with a write back operation in step 1009. The write back need only be applied to memory cells that had their state changed by the write of step 1002. The write back operation may have the opposite polarity as the write of the SRR of step 1002.

If ECC fails then the memory system performs a second SRR. In an embodiment, the second SRR has a lower bit error rate (BER) than the first SRR. Step 1010 includes reading the group of memory cells using the second SRR. In one embodiment, the second SRR includes a second write (Write2) operation of each memory cell followed by a third read operation (Read3) of each memory cell. In an embodiment, Read3 has a longer duration than Read2. The longer duration of Read3 may provide for a lower BER for the second SRR. In another embodiment, Write2 in the second SRR has a longer duration than Write1 of the first SRR. The longer duration of the second write signal may provide for a lower BER for the second SRR.

The second SRR has operations that correspond to the operations of the first SRR, but does not necessarily have the same number of operations. In one embodiment, the second SRR does not have a read operation that corresponds to the first read of the first SRR by using the stored signal from the first read of the first SRR. However, the write of the second SRR may perform the same function as the first SRR. Also, the $2^{nd}$ read in the second SRR may perform the same function as the final read of the first SRR. Likewise, the signals in the second SRR correspond to signals in the first SRR, but the second SRR does not necessarily use the same number of signals. In one embodiment, the write signal in the second SRR corresponds to the write signal in the first SRR and the read signal in the second SRR corresponds to the final read signal in the first SRR. In a further embodiment the write signals of the $2^{nd}$ SRR may be of different amplitude relative to the first SRR, either more or less.

Step 1012 includes running the ECC algorithm on the data read using the second SRR. Step 1012 may, for example, be performed by on die ECC engine 269 or off-die by ECC engine 158. Step 1014 includes a determination of whether the ECC algorithm passed or failed. If ECC passes then the data is provided to a host 120 or other requestor in step 1016. In step 1017 the original data is written back to any cells that had data flipped by the destructive write. If ECC fails then the memory system reports a fail status to the host 120 or other requestor in step 1018.

FIG. 10B is a flowchart of one embodiment of a process 1050 of reading programmable resistance memory cells with a fast SRR in which a second SRR is initiated whether or not the first SRR fails. In one embodiment a group of memory cells that stores an ECC codeword is read. In one embodiment a group of memory cells reside in different tiles of a cross-point array. In one embodiment the memory cells are MRAM cells. In one embodiment, the memory cells each have a programmable resistance memory element in series with a threshold switching selector (e.g., OTS). In one embodiment, a forced-current approach is used. In one embodiment, a forced-voltage approach is used.

Step 1052 includes reading the group of the programmable resistance memory cells using a fast SRR. The fast SRR may be similar to the fast SRR described in step 1002 in FIG. 10A. Step 1054 includes running an ECC algorithm on the data read using the fast self-referenced read. Step 1054 may be performed on the same die that has the memory cells or off-die. In one embodiment, step 1054 is performed by on die ECC engine 269 (see FIG. 2 or 3). In one embodiment, step 1054 is performed by off-die by ECC engine 158 (see FIG. 1).

Step 1056 includes initiating a read of the memory cells using a second (e.g., nominal) SRR. Thus, the second SRR may be initiated whether or not the first SRR is successful. Note that in some embodiments, if the first SRR is successful then the second SRR will aborted prior to completion. In an embodiment, the second SRR has a lower bit error rate (BER) than the first SRR. The second SRR may be similar to the second SRR described in step 1010 in FIG. 10A.

Step 1058 includes a determination of whether the ECC algorithm on the results from the first SRR passed or failed. If a codeword stored in the group is successfully decoded (e.g., all errors corrected) then the ECC passes. If ECC passes then the data is provided to a host 120 or other requestor in step 1060. Step 1062 is for the memory system to note that any data from the second SRR should be ignored. In one embodiment, the second SRR is aborted (or terminated) prior to completion. In an embodiment, the fast SRR is a destructive read. Therefore, the original state of the memory cell may be restored with a write back operation in step 1064. The write back need only be applied to memory cells that had their state changed by the write of the first SRR in step 1052. The write back operation may have the opposite polarity as the write of the SRR of step 1052.

If ECC on the results of the first SRR fails (step 1058 is fail), then the memory system will attempt to provide data from the results of the second SRR. In step 1066, an ECC algorithm is run on results from the second SRR. Step 1066 may, for example, be performed by on die ECC engine 269 or off-die by ECC engine 158. Step 1068 includes a determination of whether the ECC algorithm on the data from the second SRR passed or failed. If ECC passes then the data is provided to a host 120 or other requestor in step 1070. In step 1072 the original data is written back to any cells that had data flipped by the destructive write in step 1052 and/or 1056. If ECC fails then the memory system reports a fail status to the host 120 or other requestor in step 1074.

Figure 11A:
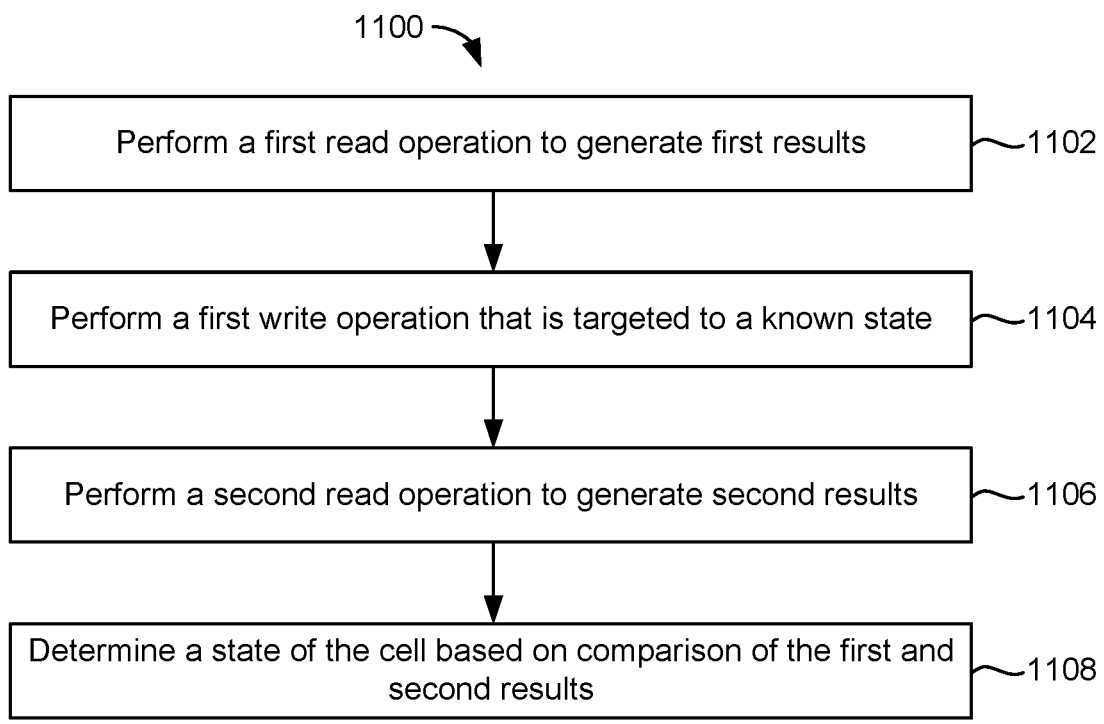
FIG. 11A is a flowchart of one embodiment of a process of reading a memory cell using a fast self-referenced read.

FIG. 11A is a flowchart of one embodiment of a process 1100 of reading a memory cell using a first SRR. The process 1100 may be performed in parallel on many cells to read a group of cells. The process 1100 provides further details for one embodiment of step 1002 in FIG. 10. In one embodiment, a forced-current approach is used, wherein the signals that are referred to in process 1100 are currents that are forced through the memory cell. In one embodiment, a forced-voltage approach is used, wherein the signals that are referred to in process 1100 are voltages that are forced across the memory cell.

Step 1102 includes performing a first read operation to generate first results. Step 1102 may include applying a first read signal to the memory cell. Step 1102 may also include sensing the memory cell in response to the read signal and storing a first read result. In an embodiment, the first read result is stored on a capacitor. In one embodiment, the memory cell has a threshold switching selector in series with a programmable resistance memory element. Prior to step 1102 the memory system may apply a signal to the memory cell to cause a threshold switching selector to turn on. In an embodiment of a forced current approach, prior to the threshold switching selector turning on, the first read current does not pass through the memory cell. Further details are discussed below.

Step 1104 includes performing a first write operation of the memory cell that is targeted to a known state. For an MRAM embodiment the known state could be the AP-state or the P-state. Step 1104 may include applying a first write signal to the memory cell for a first time duration. The first write signal is intended to write the memory cell to the known state regardless of its pre-read state. However, the first write signal has a relatively short duration (compared to the nominal write of the second SRR). Therefore, in some fairly rare cases the memory cell might not be written to the known state. However, as will be discussed in more detail below, the write in the second SRR may have a longer duration in order to substantially increase the probability that the memory cell will be written to the known state. Using the shorter duration write in the first SRR provides for a fast SRR that will be successful in most cases.

Step 1106 includes performing a second read operation of the memory cell to generate second results. Step 1106 may include applying a second read signal to the memory cell. Step 1106 may also include sensing the memory cell in response to the read signal to determine the second read result. In one embodiment, the second read operation is shorter than the first read operation, which saves time for the first SRR. However, using the shorter time duration for this read operation may slightly increase the read error rate. In an embodiment, the length of the read operation is defined as the time between starting to apply the read signal and the time at which sensing the memory cell is complete. In some embodiments, the second read signal continues to be applied after the second read operation is completed, as will be discussed more fully below.

Step 1108 includes determining a state of the memory cell based on a comparison of the first read result with the second read result. After performing process 1100 on each memory cell in the group the ECC algorithm may be run on the results from step 1108 (see step 1004 in FIG. 10).

Figure 11B:
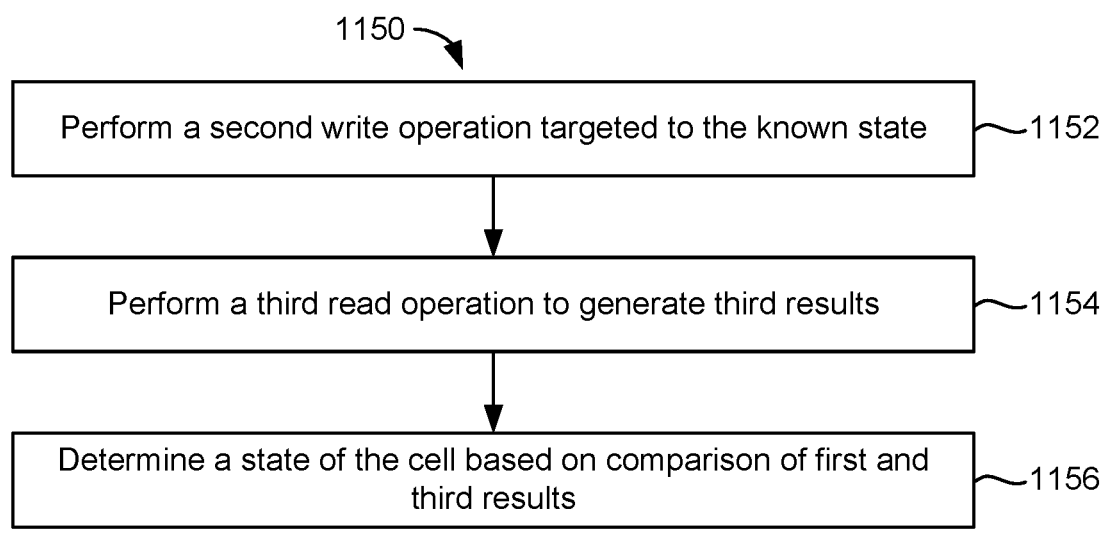
FIG. 11B is a flowchart of one embodiment of a process of reading a memory cell using a nominal self-referenced read.

FIG. 11B is a flowchart of one embodiment of a process 1150 of reading a memory cell using a second (e.g., nominal) self-referenced read. The process 1150 may be performed in parallel on many cells to read a group of cells. The process 1150 provides further details for one embodiment of step 1010 in FIG. 10. The process 1150 may thus be performed following a decoding failure when using the first SRR of process 1100 in FIG. 11A. Thus, the process 1150 may be performed on the same memory cell that was read in process 1100. In an embodiment, if a forced-current approach is used in process 1100 then a forced-current approach is also used in process 1150. In an embodiment, if a forced-voltage approach is used in process 1100 then a forced-voltage approach is also used in process 1150.

Step 1152 includes performing a second write operation on the memory cell that targets the known state. In an embodiment, this is the same state that was targeted in step 1104 of process 1100. Step 1152 includes applying a second write signal to the memory cell for a second time duration. The second write signal is intended to write the memory cell to the known state referred to in step 1104 of FIG. 11A. However, the second write signal may have a longer duration than the first write signal in the first SRR. Therefore, the probability that the memory cell will be written to the known state may be increased. Using the longer duration write in the second SRR provides for a lower BER than using a shorter duration write in the first SRR.

As discussed above, in one embodiment, the memory cell has a threshold switching selector that was turned on in process 1100. In an embodiment, after process 1100 the memory system continues to apply the second read signal (of step 1106) to the memory cell to keep the threshold switching selector turned on between process 1100 and 1150. Therefore, the threshold switching selector will not need to be switched on again in process 1150. Therefore, time is saved. Moreover, avoiding turning on the threshold switching selector a second time may improve the read accuracy.

Step 1154 includes performing a third read operation of the memory cell to generate third results. Step 1154 may include applying a third read signal to the memory cell. Step 1154 may also include sensing the memory cell in response to the read signal to determine a third read result. In one embodiment, this third read operation is longer than the second read operation in the first SRR in step 1106 of FIG. 11A. Using the longer time duration for this read operation may decrease the BER for the second SRR relative to the first SRR. As noted above, the definition of the read operation duration may be the time between starting to apply the read signal and the time at which sensing the memory cell is complete.

Step 1156 includes determining a state of the memory cell based on a comparison of the first read result (that was saved from step 1102 in FIG. 11A) with the third read result. In one embodiment the first read result is adjusted prior to the comparison. For example, the first read result may be a voltage that is increased or decreased prior to comparison with a voltage based on the third read result. The amount by which the first read voltage is changed may be based on the expected difference between the LRS and the HRS (which impacts the sensed voltage). After performing process 1150 on each memory cell in the group the ECC algorithm may be run on the results from step 1156 (see step 1012 in FIG. 10).

Figure 13A:
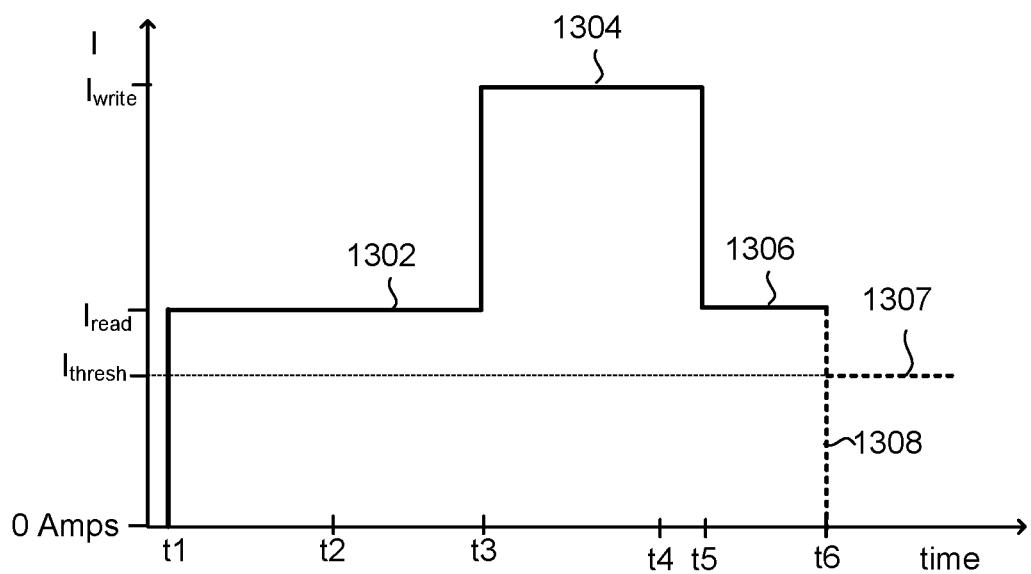
FIG. 13A depicts current versus time for the access current that is driven through a selected word line during an embodiment of a current-force first SRR.
Figure 13B:
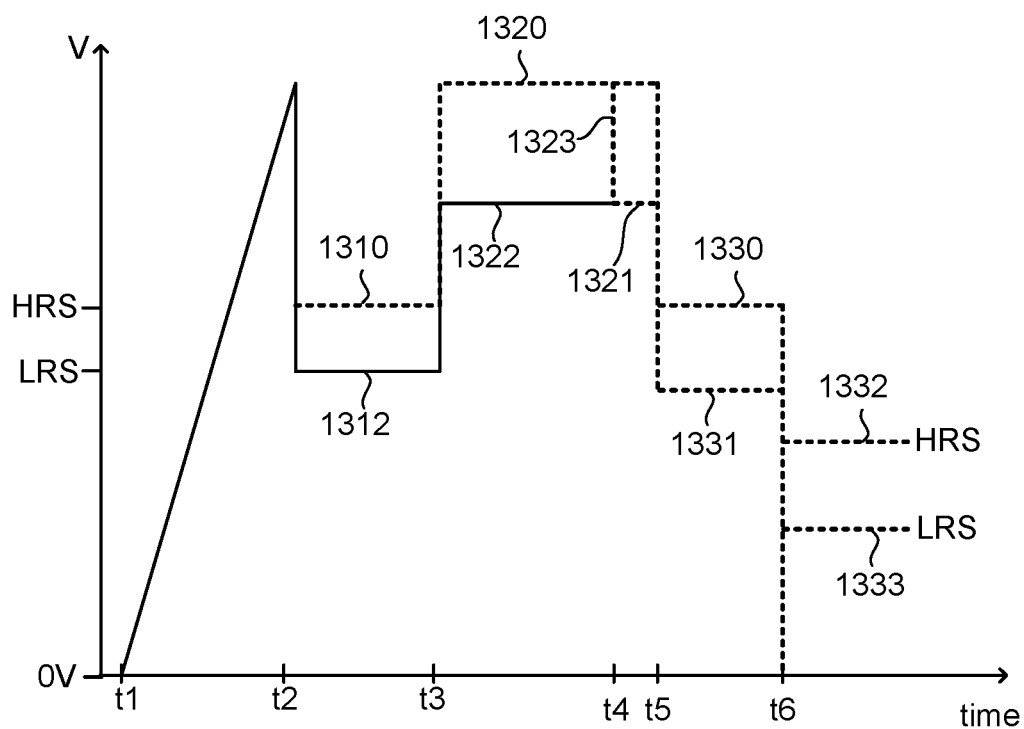
FIG. 13B depicts voltage versus time for the voltage across a selected MRAM cell during an embodiment of the current-force first SRR of FIG. 13A.

FIG. 12 is a flowchart depicting one embodiment of a process 1200 of current-force SRR. The SRR may be referred to as a destructive SRR, which means that the original state of the memory cell may be changed during the SRR. Process 1200 provides further details of one embodiment of the first SRR of step 1002. Process 1200 provides further details of one embodiment of the first SRR of process 1100. Process 1200 describes reading one memory cell and may be performed in parallel on the memory cells in the code-word group (which may reside in different tiles or groups of tiles). In one embodiment, the process 1200 is performed by a control circuit in the memory die 292. In one embodiment, the process 1200 is performed by a control circuit in the control die 290. In one embodiment, the process 1200 is performed by a control circuit in the local memory 140. Process 1200 will be discussed with reference to FIGS. 13A and 13B. FIG. 13A depicts current versus time for the access current that is driven through a selected word line during an embodiment of current-force SRR. FIG. 13B depicts voltage versus time for the voltage across a selected MRAM cell during an embodiment of current-force SRR.

Step 1201 includes driving a first read current into the selected word line to charge up the selected word line while applying a select voltage to a selected bit line in order to turn on the threshold switching selector of the selected MRAM cell. FIGS. 13A and 13B will now be discussed with respect to one MRAM cell 401 to further elaborate on step 1201. With reference to FIG. 13A, the current is increased to $I_{read}$ at time t1. With reference to FIG. 13B, the voltage across the memory cell 401 increases between t1 to t2. The threshold switching selector 502 is off between t1 and t2. Between t1 and t2, the current causes the word line voltage to increase. The current also supports any leakage in the path. Once the voltage across threshold switching selector 502 reaches the threshold voltage $V_{th}$ of the threshold switching selector 502, it will turn on and switch to a low resistance state (at t2). Thus, the voltage across the series combination of the threshold switching selector 502 and the resistive MRAM element 902 ramps up between t1 and t2 as the threshold switching selector is in an off state.

Step 1202 includes driving the first read current through the selected MRAM cell while the threshold switching selector remains on. With reference to FIG. 9, $I_{access}$ is driven by current driver 910g through selected first conductive line 906g to drive $I_{access}$ through memory cell 401a using a current of, for example, 15 ua. With reference to FIG. 9, $V_{select\_BL}$ is applied by voltage driver 912b to second conductive line 908b. In one embodiment, for example, $I_{access}$ is 15 µA and $V_{select\_BL}$ is 0V. In another embodiment, the current is −15 ua and $V_{select\_BL}$ is 3.3V for 20 nm CD MRAM with RA 10 that may have low resistance state of about 25K Ohm and high resistance state of about 50K Ohm.

FIGS. 13A and 13B will now be discussed with respect to one MRAM cell 401 to further elaborate on step 1202. With reference to FIG. 13A, the current remains at $I_{read}$ between t2 and t3 (line 1302). With reference to FIG. 13B, the threshold switching selector 502 remains on between t2 and t3 (in a low resistance state). Once the threshold switching selector 502 is in the on state (at t2), the $I_{read}$ current will flow through the selected memory cell 401. As the access current is held fixed at $I_{read}$, the voltage across the memory cell will drop to a level dependent upon the series resistance of the MRAM element and the on-state resistance of the threshold switching selector 502. For a binary embodiment in which a memory cell only stores two states, the memory cell will have a high resistance, AP-state, for example 50K Ohm, and a low resistance, P-state, for example 25K Ohm. The resultant voltage across the series connected MRAM element and threshold switching selector 502 in response to the $I_{read}$ current for the high resistance state (HRS) and low resistance state (LRS) are respectively shown as lines 1310 and 1312. Although the discussion here is in the context of an MRAM based memory cell being placed in series with the threshold switching selector, this read technique can similarly be applied to other programmable resistance memory cells, such as PCM or ReRAM devices.

Returning again to FIG. 12, step 1204 includes sensing a voltage across the selected memory cell. Step 1204 may also include storing the sensed voltage on, for example, a capacitor. Step 1205 includes adjusting the stored voltage by adding (e.g., Deck1) or subtracting (e.g., Deck2) a 150 mV voltage. In one embodiment, Deck1 and Deck2 are two different layers (see 418, 420 in FIG. 4D).

Step 1206 includes driving a write current through the selected word line while applying a select voltage to the selected bit line to force the write current through the selected MRAM cell. With reference to FIG. 9, $I_{access}$ is driven by current driver 910g through selected first conductive line 906g to force $I_{access}$ through memory cell 401a. With reference to FIG. 9, $V_{select\_BL}$ is applied by voltage driver 912b to second conductive line 908b. In one embodiment, $I_{access}$ to write is 30 μA and $V_{select\_BL}$ is 0V. In another embodiment, $I_{access}$ to write is −30 μA and $V_{select\_BL}$ is 3.3V. As indicated in FIG. 9, unselect voltages are applied to unselected word lines and unselected bit lines.

FIGS. 13A and 13B will now be discussed with respect to one MRAM cell 401 to further elaborate on step 1206. With reference to FIG. 13A, the access current is increased to $I_{write}$ at time t3 and is held at $I_{write}$ until t5 (line 1304). With reference to FIG. 13B, the voltage across the MRAM cell 401 increases at t3. If the MRAM cell 401 was in the HRS (line 1310), then the voltage across the MRAM cell will increase to the level indicated by line 1320 at t3 and stay there until t5. Recall that the HRS is the AP-state. Thus, this MRAM cell will stay in the AP-state.

If the MRAM cell 401 was in the LRS (line 1312), then the voltage across the MRAM cell will increase to the level indicated by line 1322 at t3. Recall that the LRS is the P-state. If the MRAM cell 401 was in the P-state, it may switch to the AP-state. FIG. 13B shows line 1322 may increase at t4 (line 1323) to meet with line 1320. This represents the MRAM cell has switched from the P-state (LRS) to the AP-state (HRS). However, it is possible that the memory cell will not switch from the LRS to the HRS. As noted, the first SRR may use a shorter write pulse than a nominal write pulse in order to save time. Thus, there is a small chance that write pulse is too short in duration to switch the memory cell from the LRS to the HRS, which is indicated by line 1321. In an embodiment, less than 1 percent of the memory cells that were in the LRS pre-write will fail to switch to the HRS.

Returning again to FIG. 12, step 1208 includes driving a second read current through the selected word line while the threshold switching selector remains on. Step 1208 includes applying the select voltage to the selected bit line while driving the read current to the selected word line in order to force the second access current through the selected MRAM cell. In one embodiment, the second access current has the same direction and substantially the same magnitude as the first access current. With reference to FIG. 9, $I_{access}$ is driven by current driver 910g through selected first conductive line 906g to force $I_{access}$ through memory cell 401a. With reference to FIG. 9, $V_{select}$ is applied by voltage driver 912b to second conductive line 908b. In one embodiment, $I_{access}$ is 15 μA and $V_{select}$ is 0V.

FIGS. 13A and 13B will now be discussed with respect to one MRAM cell 401 to further elaborate on step 1208. With reference to FIG. 13A, the current is decreased from $I_{write}$ to $I_{read}$ at time t5 and is held at $I_{read}$ at least until t6 (line 1306). With reference to FIG. 13B, for memory cells in the HRS, the voltage across the memory cell 401 decreases at t5 to the level indicated by 1330 and holds at that level while the read current continues to be applied. Note that line 1330 is at the HRS level. However, as noted above, there is a small chance that the write did not place a cell into the HRS. Thus, if a memory cell is in the LRS after the write (line 1321), the voltage across this memory cell 401 may decrease at t5 to the level indicated by 1331 and holds at that level while the read current continues to be applied. The line 1331 is at the LRS level. One option is to continue to apply a current after t6 (line 1307) that will keep the threshold switching selector on in the event that a second SRR is performed. This current ($I_{thresh}$) after t6 may have a lower magnitude than the read current to help reduce read disturb, while being high enough to keep the selector on. Another option is to bring the current down to 0 Amps at t6 (line 1308).

Returning again to FIG. 12, step 1210 includes sensing the voltage across the selected memory cell. Step 1210 also includes comparing the voltage sensed in step 1210 with the stored voltage (as adjusted in step 1205).

Step 1212 includes determining a pre-read state of the selected MRAM cell. Step 1212 is based on a comparison of a stored voltage from driving the first read current through the selected memory cell (as adjusted by step 1205) to the voltage from forcing the second read current through the selected memory cell.

FIGS. 13A and 13B will now be discussed with respect to one MRAM cell 401 to further elaborate on step 1212. The first voltage on the selected word line from applying the first read current will be the voltage between t2 and t3. Hence, the first voltage is either the HRS level 1310 or the LRS level 1312. Note that this first voltage may be stored in step 1204 by, for example, charging a sense capacitor using the word line voltage. However, this voltage is adjusted as described in step 1205. The second voltage on the selected word line from applying the second read current will be the voltage between t5 and t6. This second voltage will typically be at about the HRS level 1330. However, as noted the memory cell may fail to switch to the HRS in which case the voltage may be at the LRS level 1331 after t5. Comparing the first (adjusted) voltage with the second voltage may thus be used to determine whether the MRAM cell was at the HRS level 1310 or the LRS level 1312 between t2 and t3. To facilitate comparison, the level generated by the Read1 current may be stored and adjusted by about half the voltage difference between HRS and LRS, for example 150 mV. Whether the adjustment is positive or negative may depend on the polarity of the read current. Also, the direction of the adjustment may be reversed depending on MRAM cell orientation as will be apparent to one reasonably skilled in the art. The labels HRS and LRS on the Voltage axis in FIG. 13B refer to the HRS level or the LRS level, respectively, under the assumption that the read current $I_{read}$ is being applied to the cell. After t6, the current may be reduced from $I_{read}$ to $I_{thresh}$ thereby resulting in a drop of voltage across the cell as indicated by the HRS level dropping from 1330 to 1332 and the LRS level dropping from 1331 to 1333.

As noted above, most of the time the first SRR will be successfully. For example, an ECC codeword stored in a group of cells will be successfully decoded. However, in some cases the decoding will fail. One factor in failing to decode will be the cases in which a memory cell was not successfully written to the HRS state in step 1206. In the event that the second read operation is significantly shorter than the first read operation this may also contribute to failing to decode the ECC codeword.

Figure 14:
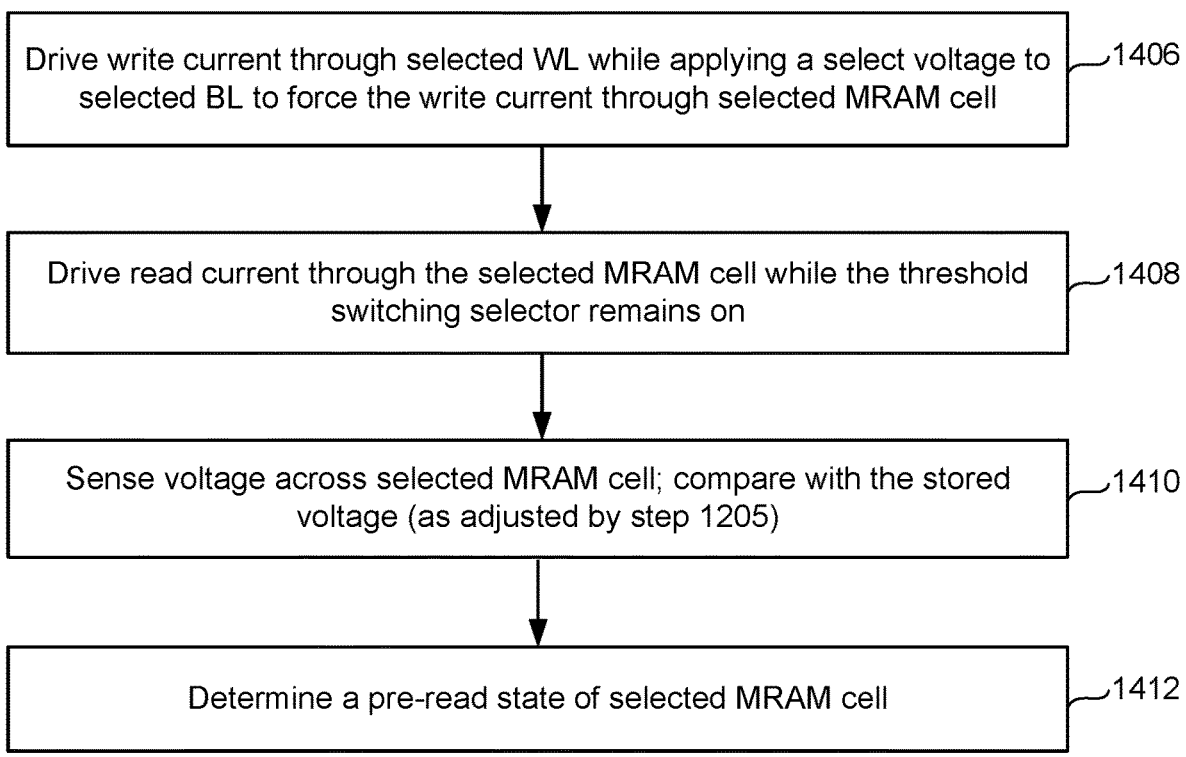
FIG. 14 is a flowchart depicting one embodiment of a process of current-force second SRR.
Figure 15A:
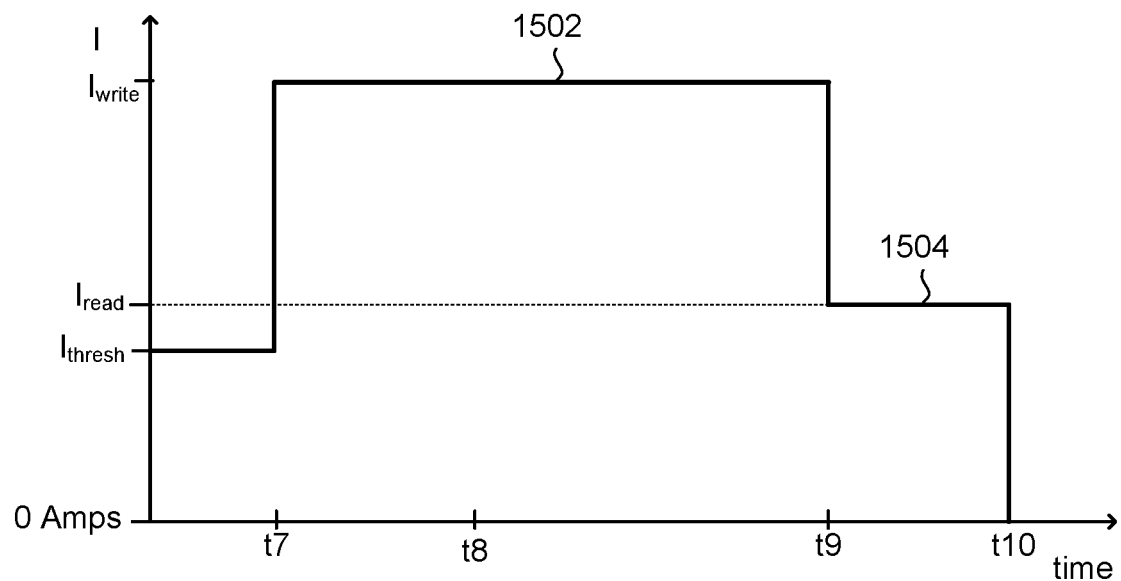
FIG. 15A depicts current versus time for the access current that is driven through a selected word line during an embodiment of current-force second SRR.
Figure 15B:
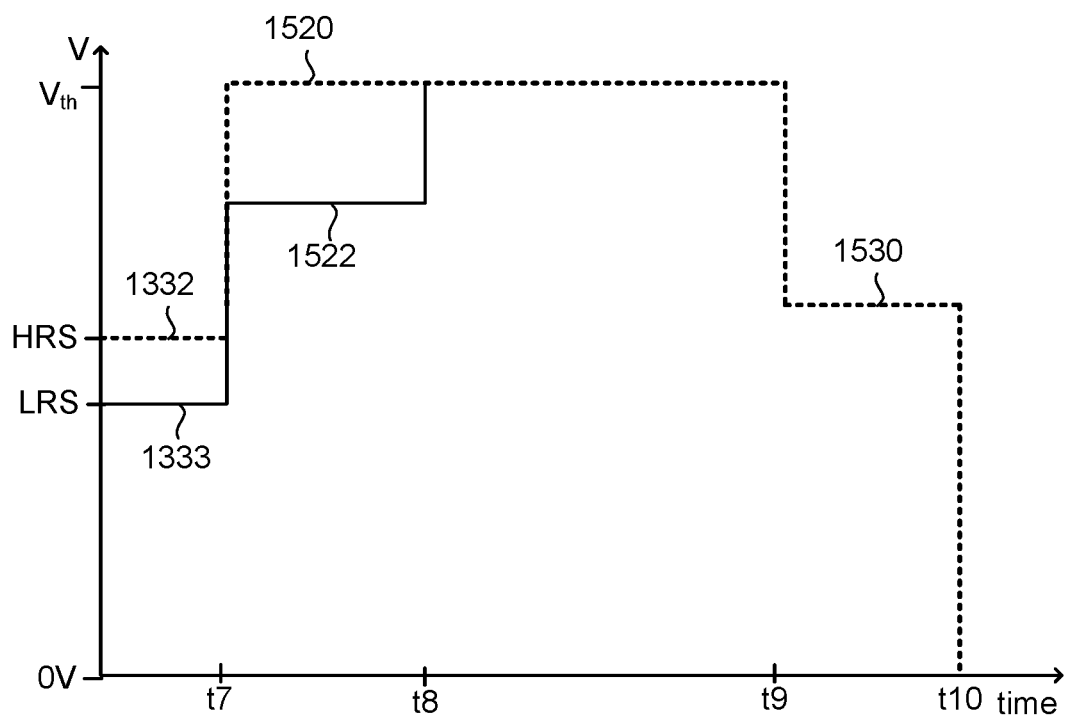
FIG. 15B depicts voltage versus time for the voltage across a selected MRAM cell during an embodiment of current-force second SRR.

FIG. 14 is a flowchart depicting one embodiment of a process 1400 of current-force second SRR. Process 1400 provides further details of one embodiment of the second SRR of step 1010. Process 1400 provides further details of one embodiment of the second SRR of process 1150. Process 1400 describes reading one memory cell and may be performed in parallel on the memory cells in the code-word group (which may reside in different tiles or groups of tiles). In one embodiment, the process 1400 is performed by a control circuit in the memory die 292. In one embodiment, the process 1400 is performed by a control circuit in the control die 290. In one embodiment, the process 1400 is performed by a control circuit in the local memory 140. Process 1400 will be discussed with reference to FIGS. 15A and 15B. FIG. 15A depicts current versus time for the access current that is driven through a selected word line during an embodiment of current-force second SRR. FIG. 15B depicts voltage versus time for the voltage across a selected MRAM cell during an embodiment of current-force second SRR.

Step 1406 includes driving a write current through the selected word line while applying a select voltage to the selected bit line to force the write current through the selected MRAM cell. With reference to FIG. 9, $I_{access}$ is driven by current driver 910g through selected first conductive line 906g to force $I_{access}$ through memory cell 401a. With reference to FIG. 9, $V_{select\_BL}$ is applied by voltage driver 912b to second conductive line 908b. In one embodiment, $I_{access}$ to write is 30 µA and $V_{select\_BL}$ is 0V. In another embodiment, $I_{access}$ to write is −30 µA and $V_{select\_BL}$ is 3.3V.

FIGS. 15A and 15B will now be discussed with respect to one MRAM cell 401 to further elaborate on step 1406. With reference to FIG. 15A, the current may be at a non-zero value (e.g., $I_{thresh}$) before the write. In an embodiment, $I_{thresh}$ has a sufficient magnitude to keep the threshold switching selector on. At t7, the current is increased to $I_{write}$ and is held at $I_{write}$ until t9 (line 1502). With reference to FIG. 15B prior to t7, the memory cell could be in either the HRS (level 1332) or the LRS (level 1333). Recall that the first SRR typically results in the cell being written to the HRS; however, there is some chance that the cell will be in the LRS after the first SRR. The voltage across the MRAM cell 401 increases at t7. If the MRAM cell 401 was in the HRS (line 1332), then the voltage across the MRAM cell will increase to the level indicated by line 1520 at t7 and stay there until t9. Recall that the HRS is the AP-state. Thus, this MRAM cell will stay in the AP-state.

If the MRAM cell 401 was in the LRS (line 1333), then the voltage across the MRAM cell will increase to the level indicated by line 1522 at t7. Recall that the LRS is the P-state. If the MRAM cell 401 was in the P-state, it will switch to the AP-state. FIG. 15B shows line 1522 may increase at t8 to meet with line 1520. This represents the MRAM cell has switched from the P-state (LRS) to the AP-state (HRS).

In an embodiment, the duration of the write current between t7 and t9 in FIG. 15A is longer than the duration of the write current between t3 and t5 in FIG. 13A. This increased time duration can lower the BER for the write of the second SRR. For example, memory cells that failed to be written to the HRS in the first SRR are likely to be written to the HRS in the second SRR. The BER for the second SRR may be defined based on the number of cells that were not written to the HRS after the second SRR (whether or not the cell was already in the HRS). In one embodiment, the BER for the second SRR is no more than half the BER for the first SRR. In one embodiment, the BER for the second SRR is less than 10 percent the BER for the first SRR.

Returning again to FIG. 14, step 1408 includes driving a third read current through the selected word line while the threshold switching selector remains on. Step 1408 includes applying the select voltage to the selected bit line while driving the third read current to the selected word line in order to force the third read current through the selected MRAM cell. In one embodiment, third read current has the same direction and substantially the same magnitude as the first and second read currents. With reference to FIG. 9, $I_{access}$ is driven by current driver 910g through selected first conductive line 906g to force $I_{access}$ through memory cell 401a. With reference to FIG. 9, $V_{select}$ is applied by voltage driver 912b to second conductive line 908b. In one embodiment, $I_{access}$ is 15 µA and $V_{select}$ is 0V.

FIGS. 15A and 15B will now be discussed with respect to one MRAM cell 401 to further elaborate on step 1408. With reference to FIG. 15A, the current is decreased from $I_{write}$ to $I_{read}$ at time t9 and is held at $I_{read}$ until t10 (line 1504). With reference to FIG. 15B, the voltage across the memory cell 401 decreases at t9 to the level indicated by 1530 and holds at that level while the read current continues to be applied. Note that line 1530 is at the HRS level.

Returning again to FIG. 14, step 1410 includes sensing the voltage across the selected memory cell. Step 1410 also includes comparing the voltage sensed in step 1410 with the stored voltage (as adjusted in step 1205 in process 1200).

Step 1412 includes determining a pre-read state of the selected MRAM cell. Step 1412 is based on a comparison of a stored voltage from driving the first read current through the selected memory cell (as adjusted by step 1205) to the voltage from forcing the third read current through the selected memory cell.

FIGS. 15A and 15B will now be discussed with respect to one MRAM cell 401 to further elaborate on step 1412. The first voltage on the selected word line from applying the first read current will be the voltage that was saved from step 1204 of process 1200 (as adjusted by step 1205). Hence, the first voltage may be either the HRS level 1310 or the LRS level 1312 (see lines 1310 and 1312 in FIG. 13B). Note that this first voltage may be stored in step 1204 by, for example, charging a sense capacitor using the word line voltage. However, this voltage is adjusted as described in step 1205. This adjustment may be about half of the voltage difference between LRS and HRS. Whether the adjustment is positive or negative may depend on whether the read was to the AP-state or to the P-state, as well as the orientation of the cell. The voltage on the selected word line from applying the read current of step 1410 will be the voltage between t9 and t10. This voltage will typically be at about the HRS level 1530. Comparing the first (adjusted) voltage with this voltage may thus be used to determine whether the MRAM cell was at the HRS level or the LRS level prior to the first SRR. After step 1412 decoding may be performed as described in step 1012 of process 1000 in FIG. 10.

After the SRR is complete, a write-back may be performed. Thus, as indicated in FIG. 10 the write-back may be performed after successful completion of the first SRR (step 1009) or after successful completion of the second SRR (step 1017). In a current-force approach, the write-back includes applying a current having the opposite polarity as the current used in step 1206 and optionally step 1406. The write back is used to restore the original state of the respective memory cells. In an embodiment of step 1206 (and optionally step 1406) targeted the AP-state. Hence, all MRAM cells that were originally in the P-state are written back to the P-state in the write-back following the successful SRR. All MRAM cells that were originally in the AP-state may be left in the AP-state. Note that as described in process 1000, the ECC engine can decode and correct the data. Hence, the data may be error corrected prior to the write back.

In view of the foregoing, it can be seen that, according to a first embodiment, an apparatus, comprising one or more control circuits configured to connect to programmable resistance memory cells. The one or more control circuits are configured to read a group of the programmable resistance memory cells using a first self-referenced read (SRR), including applying a first sequence of signals to the memory cells. The one or more control circuits are configured to provide, in response to a failure of first SRR, data read from the group of the memory cells using a second SRR. The second SRR includes the one or more control circuits applying a second sequence of signals to the memory cells. At least one of the signals in the first sequence has a shorter duration than a corresponding signal in the second sequence.

In a second embodiment, in furtherance of the first embodiment, the first sequence of signals includes a first read signal applied to the memory cells followed by a first write signal applied to the memory cells followed by a second read signal applied to the memory cells in the first SRR. The second sequence of signals includes a second write signal applied to the memory cells followed by a third read signal applied to the memory cells. The second write signal has a longer duration than the first write signal.

In a third embodiment, in furtherance of the second embodiment, the second write signal results in a lower write bit error rate (BER) than a write BER that results from the first write signal.

In a fourth embodiment, in furtherance of the second or third embodiments, the one or more control circuits are configured to continue to apply a non-zero read signal to the memory cells until the second write signal is applied.

In a fifth embodiment, in furtherance of any of the first to fourth embodiments, the first SRR comprises first read operation of each memory cell followed by a first write operation to each memory cell followed by a second read operation of each memory cell. The second read operation has a first duration. The second SRR comprises a second write operation of each memory cell followed by a third read operation of each memory cell. The third read operation has a second duration that is longer than the first duration.

In a sixth embodiment, in furtherance of any of the first to fifth embodiments, the one or more control circuits are further configured to apply a decoding algorithm to results of the first SRR. The failure of the first SRR comprises a failure to decode data stored in the group of memory cells using the decoding algorithm.

In a seventh embodiment, in furtherance of any of the first to sixth embodiments, the one or more control circuits is configured to: apply a first read signal to the memory cells followed by applying a first write signal to the memory cells followed by applying a second read signal to the memory cells in the first SRR; compare first results from applying the first read signal with second results from applying the second read signal to determine a first result for the group of memory cells; apply a second write signal to the memory cells followed by applying a third read signal to the memory cells in the second SRR; compare the first results with third results from applying the third read signal to determine a second result for the group of memory cells; and provide the second result to a host 120 or other requestor in response to success of the second SRR.

In an eighth embodiment, in furtherance of any of the first to seventh embodiments, the one or more control circuits is configured to apply a first read current through the memory cells followed by applying a first write current through the memory cells followed by applying a second read current through the memory cells in the first SRR. The one or more control circuits is configured to apply a second write current through the memory cells followed by applying a third read current through the memory cells in the second SRR.

In a ninth embodiment, in furtherance of any of the first to eighth embodiments, the programmable resistance memory cells each have a magnetoresistive random access memory (MRAM) element.

In a tenth embodiment, in furtherance of any of the first to ninth embodiments, the programmable resistance memory cells each have a threshold switching selector in series with a programmable resistance memory element.

In an eleventh embodiment, in furtherance of any of the first to tenth embodiments, the apparatus further comprises one or more cross-point memory arrays. Each cross-point memory array comprises a plurality of first conductive lines, a plurality of second conductive lines, and a plurality of the programmable resistance memory cells. Each respective programmable resistance memory cell is connected at a cross-point junction of one of the first conductive lines and one of the second conductive lines.

In a twelfth embodiment, in furtherance of any of the first to eleventh embodiments, the one or more control circuits are configured to initiate the second SRR after the first SRR regardless of whether the first SRR fails.

In a thirteenth embodiment, in furtherance of any of the first to eleventh embodiments, the one or more control circuits are configured to only initiate the second SRR in response to failure of the first SRR.

A further aspect includes a method for reading programmable resistance memory cells. The method comprises reading a group of the programmable resistance memory cells using a first self-referenced read, including performing a first read operation of each memory cell followed by performing a first destructive write operation of each memory cell followed by performing a second read operation of each memory cell. The first destructive write operation comprises applying a first write signal having a first time duration to each memory cell. The method comprises determining a first state for each programmable resistance memory cell based on a comparison of a first result from performing the first read operation and a second result from performing the second read operation. The method comprises executing a decoding algorithm on the first state for each programmable resistance memory cell. The method comprises reading the group of the programmable resistance memory cells using a second self-referenced read responsive to a failure of the decoding algorithm on the first state for each programmable resistance memory cell, including performing a second destructive write operation on each memory cell followed by performing a third read operation on each memory cell. The second destructive write operation includes applying a second write signal having a second time duration greater than the first time duration to each memory cell. The method comprises determining a second state for each programmable resistance memory cell based on a comparison of the first result from performing the first read operation and a third result from performing the third read operation.

A further aspect includes a memory system, comprising a memory system, comprising one or more cross-point memory arrays and one or more control circuits in communication with the one or more cross-point memory arrays. Each array comprises a plurality of first conductive lines, a plurality of second conductive lines, and a plurality of programmable resistance memory cells. Each respective memory cell is connected at a cross-point junction of one of the first conductive lines and one of the second conductive lines. The one or more control circuits are configured to read a group of the memory cells using a first self-referenced read (SRR). The one or more control circuits are configured to execute a decoding algorithm on first results of reading the group using the first self-referenced read, wherein the first self-referenced read has a first bit error rate (BER). The one or more control circuits are configured to initiate a read the group of the memory cells using a second SRR following the first SRR. The one or more control circuits are configured to execute the decoding algorithm on second results of reading the group using the second SRR responsive to a decoding failure on the first results, wherein the second SRR has a second BER that is lower than the first BER.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
one or more control circuits configured to connect to programmable resistance memory cells, wherein the one or more control circuits are configured to:
read a group of the programmable resistance memory cells using a first self-referenced read (SRR), including applying a first sequence of signals to the memory cells; and
provide, in response to a failure of first SRR, data read from the group of the memory cells using a second SRR, the second SRR including the one or more control circuits applying a second sequence of signals to the memory cells, wherein at least one of the signals in the first sequence has a shorter duration than a corresponding signal in the second sequence.

2. The apparatus of claim 1, wherein:
the first sequence of signals includes a first read signal applied to the memory cells followed by a first write signal applied to the memory cells followed by a second read signal applied to the memory cells in the first SRR; and
the second sequence of signals includes a second write signal applied to the memory cells followed by a third read signal applied to the memory cells, wherein the second write signal has a longer duration than the first write signal.

3. The apparatus of claim 2, wherein the second write signal results in a lower write bit error rate (BER) than a write BER that results from the first write signal.

4. The apparatus of claim 2, wherein the one or more control circuits are configured to continue to apply a non-zero read signal to the memory cells until the second write signal is applied.

5. The apparatus of claim 1, wherein:
the first SRR comprises a first read operation of each memory cell followed by a first write operation to each memory cell followed by a second read operation of each memory cell, wherein the second read operation has a first duration; and
the second SRR comprises a second write operation of each memory cell followed by a third read operation of each memory cell, wherein the third read operation has a second duration that is longer than the first duration.

6. The apparatus of claim 1, wherein the one or more control circuits are further configured to apply a decoding algorithm to results of the first SRR, the failure of the first SRR comprises a failure to decode data stored in the group of memory cells using the decoding algorithm.

7. The apparatus of claim 1, wherein the one or more control circuits are configured to:
apply a first read current through the memory cells followed by applying a first write current through the memory cells followed by applying a second read current through the memory cells in the first SRR; and
apply a second write current through the memory cells followed by applying a third read current through the memory cells in the second SRR.

8. The apparatus of claim 1, wherein the programmable resistance memory cells each have a magnetoresistive random access memory (MRAM) element.

9. The apparatus of claim 1, wherein the programmable resistance memory cells each have a threshold switching selector in series with a programmable resistance memory element.

10. The apparatus of claim 1, wherein the one or more control circuits are configured to:
initiate the second SRR after the first SRR regardless of whether the first SRR fails.

11. The apparatus of claim 1, wherein the one or more control circuits are configured to:

only initiate the second SRR in response to failure of the first SRR.

12. A method for reading programmable resistance memory cells, the method comprising:
reading a group of the programmable resistance memory cells using a first self-referenced read, including performing a first read operation of each memory cell followed by performing a first destructive write operation of each memory cell followed by performing a second read operation of each memory cell, wherein the first destructive write operation comprises applying a first write signal having a first time duration to each memory cell;
determining a first state for each programmable resistance memory cell based on a comparison of a first result from performing the first read operation and a second result from performing the second read operation;
executing a decoding algorithm on the first state for each programmable resistance memory cell;
reading the group of the programmable resistance memory cells using a second self-referenced read responsive to a failure of the decoding algorithm on the first state for each programmable resistance memory cell, including performing a second destructive write operation on each memory cell followed by performing a third read operation on each memory cell, wherein the second destructive write operation includes applying a second write signal having a second time duration greater than the first time duration to each memory cell; and
determining a second state for each programmable resistance memory cell based on a comparison of the first result from performing the first read operation and a third result from performing the third read operation.

13. The method of claim 12, wherein:
the second read operation has a shorter duration than the third read operation; and
the second read operation results in a higher bit error rate (BER) than a BER that results from the third read operation.

14. The method of claim 12, wherein:
performing the first read operation of each memory cell followed by performing the first destructive write operation to each memory cell followed by performing the second read operation of each memory cell comprises forcing a first fixed magnitude read current through each memory cell followed by forcing a first fixed magnitude write current through each memory cell for the first time duration followed by forcing a second fixed magnitude read current through each memory cell; and
performing the second destructive write operation on each memory cell followed by performing the third read operation on each memory cell comprises forcing a second fixed magnitude write current through each memory cell for the second time duration followed by forcing a third fixed magnitude read current through each memory cell.

15. A memory system, comprising:
one or more cross-point memory arrays, each array comprising a plurality of first conductive lines, a plurality of second conductive lines, and a plurality of programmable resistance memory cells, each respective memory cell connected at a cross-point junction of one of the first conductive lines and one of the second conductive lines; and
one or more control circuits in communication with the one or more cross-point memory arrays, wherein the one or more control circuits are configured to:
read a group of the memory cells using a first self-referenced read (SRR);
execute a decoding algorithm on first results of reading the group using the first self-referenced read, wherein the first self-referenced read has a first bit error rate (BER);
initiate a read of the group of the memory cells using a second SRR following the first SRR; and
execute the decoding algorithm on second results of reading the group using the second SRR responsive to a decoding failure on the first results, wherein the second SRR has a second BER that is lower than the first BER.

16. The memory system of claim 15, wherein the one or more control circuits are configured to:
terminate the second SRR prior to completion of the second SRR in response to success of the first SRR.

17. The memory system of claim 15, wherein the one or more control circuits are configured to:
allow the second SRR to complete but ignore any results of the second SRR in response to success of the first SRR.

18. The memory system of claim 15, wherein:
the first SRR comprises a first read operation followed by a first write operation that is targeted to a known state followed by a second read operation, wherein the first write operation of the first self-referenced read has a first duration that results in a third BER; and
the second SRR comprises a second write operation that is targeted to the known state followed by a third read operation, wherein the second write operation has a second duration that is longer than the first duration and results in a fourth BER that is lower than the third BER.

19. The memory system of claim 18, wherein:
the second read operation has a third duration that results in a fifth BER; and
the third read operation has a fourth duration that is longer than the third duration and results in a sixth BER that is lower than the fifth BER.

20. The memory system of claim 15, wherein:
the first SRR comprises a first read operation followed by a first write that is targeted to a known state followed by a second read operation, wherein the second read operation has a first duration that results in a third BER; and
the second SRR comprises a second write that is targeted to the known state followed by a third read operation, wherein the third read operation has a second duration that is longer than the first duration and results in a fourth BER that is lower than the third BER.

* * * * *